US011057352B2

(12) United States Patent
Guberman et al.

(10) Patent No.: US 11,057,352 B2
(45) Date of Patent: Jul. 6, 2021

(54) COMMUNICATION SYSTEM AND METHOD FOR MACHINE DATA ROUTING

(71) Applicant: Xaptum, Inc., Chicago, IL (US)

(72) Inventors: Irina Guberman, Buffalo Grove, IL (US); David Robinson Bild, Chicago, IL (US); Zane Van Beckwith, Chicago, IL (US); Pradeep Srinivas Barthur, White Plains, NY (US); Venkatakumar Srinivasan, Chicago, IL (US); Rohit Pasam, Chicago, IL (US)

(73) Assignee: Xaptum, Inc., Chicago, IL (US)

( * ) Notice: Subject to any disclaimer, the term of this patent is extended or adjusted under 35 U.S.C. 154(b) by 321 days.

(21) Appl. No.: 16/246,894

(22) Filed: Jan. 14, 2019

(65) Prior Publication Data

US 2019/0268310 A1 Aug. 29, 2019

Related U.S. Application Data

(60) Provisional application No. 62/636,641, filed on Feb. 28, 2018.

(51) Int. Cl.
*H04L 29/06* (2006.01)
*H04L 29/08* (2006.01)
(Continued)

(52) U.S. Cl.
CPC ............ *H04L 63/04* (2013.01); *H04L 9/0819* (2013.01); *H04L 9/3255* (2013.01); *H04L 63/08* (2013.01);
(Continued)

(58) Field of Classification Search
CPC ..... H04L 63/04; H04L 9/0819; H04L 9/3255; H04L 63/08; H04L 67/12; H04W 12/02; H04W 12/04; H04W 12/06
See application file for complete search history.

(56) References Cited

U.S. PATENT DOCUMENTS

| 5,410,475 A | 4/1995 | Lu et al. |
| 5,978,386 A | 11/1999 | Hamalainen et al. |
(Continued)

FOREIGN PATENT DOCUMENTS

| EP | 0931418 A2 | 7/1999 |
| EP | 1446906 A1 | 8/2004 |
(Continued)

OTHER PUBLICATIONS

Handley, et al., SIP: Session Initiation Protocol, Mar. 1999, www.rfc-base.org., RFC2543.
(Continued)

*Primary Examiner* — Ayoub Alata
(74) *Attorney, Agent, or Firm* — Garlick & Markison; Gary W. Grube

(57) ABSTRACT

A method includes receiving and temporarily storing data streams from Internet of Things (IoT) sensors. The method continues with determining whether some of the data streams have been requested by a subscribing computing entity. When some of the data streams are requested and the request is valid, the method continues with sending the requested data streams to the subscribing computing entity. The method continues with receiving additional data streams from the IoT sensors and overwriting the temporary storage of the data streams with the additional data streams.

18 Claims, 25 Drawing Sheets

(51) Int. Cl.
    *H04L 9/08*      (2006.01)
    *H04W 12/06*     (2021.01)
    *H04L 9/32*      (2006.01)
    *H04W 12/04*     (2021.01)
    *H04W 12/02*     (2009.01)

(52) U.S. Cl.
    CPC ............. *H04L 67/12* (2013.01); *H04W 12/02* (2013.01); *H04W 12/04* (2013.01); *H04W 12/06* (2013.01)

(56) References Cited

U.S. PATENT DOCUMENTS

| | | | |
|---|---|---|---|
| 6,097,794 | A | 8/2000 | Suffern et al. |
| 6,430,184 | B1 | 8/2002 | Robins et al. |
| 6,651,099 | B1 | 11/2003 | Dietz et al. |
| 6,661,431 | B1 | 12/2003 | Stuart et al. |
| 6,667,700 | B1 | 12/2003 | McCanne et al. |
| 6,721,333 | B1 | 4/2004 | Milton et al. |
| 6,859,835 | B1 | 2/2005 | Hipp |
| 7,120,790 | B1 | 10/2006 | LoPresti |
| 7,319,847 | B2 | 1/2008 | Xanthos et al. |
| 7,590,715 | B1 | 9/2009 | Raanan |
| 8,073,973 | B2 | 12/2011 | McCann et al. |
| 8,291,058 | B2 | 10/2012 | Head et al. |
| 8,321,434 | B1 | 11/2012 | Ren et al. |
| 2002/0085575 | A1 | 7/2002 | Smith |
| 2002/0176378 | A1 | 11/2002 | Hamilton et al. |
| 2003/0140140 | A1 | 7/2003 | Lahtinen |
| 2004/0128552 | A1 | 7/2004 | Toomey |
| 2005/0005145 | A1 | 1/2005 | Teixeira |
| 2006/0092930 | A1 | 5/2006 | Shah |
| 2006/0126510 | A1 | 6/2006 | Russell |
| 2007/0195780 | A1 | 8/2007 | Cabeca et al. |
| 2008/0115149 | A1 | 5/2008 | Rupp et al. |
| 2009/0063625 | A1 | 3/2009 | Bagepalli et al. |
| 2009/0070779 | A1 | 3/2009 | Wang et al. |
| 2009/0097506 | A1 | 4/2009 | Subrahmanyan et al. |
| 2009/0168760 | A1 | 7/2009 | Katis et al. |
| 2009/0199210 | A1 | 8/2009 | Smith, Jr. |
| 2009/0222590 | A1 | 9/2009 | Van Aken et al. |
| 2009/0323703 | A1 | 12/2009 | Bragagnini et al. |
| 2009/0323718 | A1 | 12/2009 | Oren-Dahan |
| 2010/0023524 | A1 | 1/2010 | Gladwin et al. |
| 2010/0095367 | A1 | 4/2010 | Narayanaswamy |
| 2010/0233961 | A1 | 9/2010 | Holden et al. |
| 2011/0070868 | A1 | 3/2011 | Scholz et al. |
| 2011/0145181 | A1 | 6/2011 | Pandya |
| 2011/0228744 | A1 | 9/2011 | Cai et al. |
| 2011/0264657 | A1 | 10/2011 | Hoffman et al. |
| 2012/0102055 | A1 | 4/2012 | Hu et al. |
| 2012/0120967 | A1 | 5/2012 | Ghiasi et al. |
| 2012/0210426 | A1 | 8/2012 | Yu |
| 2012/0253728 | A1 | 10/2012 | Chamas et al. |
| 2013/0094451 | A1 | 4/2013 | Pavlovski et al. |
| 2013/0136127 | A1 | 5/2013 | Hill et al. |
| 2013/0304616 | A1 | 11/2013 | Raleigh et al. |
| 2013/0322626 | A1 | 12/2013 | Yang et al. |
| 2014/0006632 | A1 | 1/2014 | Evens |
| 2014/0028462 | A1* | 1/2014 | Lawson ............ H04Q 9/00 340/870.01 |
| 2014/0241373 | A1* | 8/2014 | Pasam ............ H04L 45/306 370/400 |
| 2014/0280829 | A1 | 9/2014 | Kjendal et al. |
| 2016/0119198 | A1 | 4/2016 | Kfir et al. |
| 2016/0173482 | A1* | 6/2016 | Wan ............ H04W 12/06 726/7 |
| 2016/0210578 | A1 | 7/2016 | Raleigh et al. |
| 2019/0069243 | A1* | 2/2019 | Bean ............ G06F 1/28 |

FOREIGN PATENT DOCUMENTS

| | | |
|---|---|---|
| EP | 1856602 A2 | 11/2007 |
| WO | 0049481 A2 | 8/2000 |

OTHER PUBLICATIONS

International Search Report corresponding to co-pending International Patent Application Serial No. PCT/US14/19595, United States Patent and Trademark Office, dated Feb. 28, 2014; (4 pages).

International Written Opinion corresponding to co-pending International Patent Application Serial No. PCT/US14/19595, United States Patent and Trademark Office, dated Feb. 28, 2014; (5 pages).

* cited by examiner

COMMUNICATION SYSTEM AND METHOD FOR MACHINE DATA ROUTING

CROSS REFERENCE TO RELATED PATENTS

The present U.S. Utility Patent Application claims priority pursuant to 35 U.S.C. § 119(e) to U.S. Provisional Application No. 62/636,641, entitled "MACHINE DATA NETWORKING IN A COMMUNICATION SYSTEM," filed Feb. 28, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computing devices to communicate text files, voice files, multimedia files, and even live data streaming is well known. Most computing devices utilize the Internet protocol (IP) to communicate via the Internet. The Internet protocol is well known to be the primary network communications protocol utilized on the Internet, where IP provides a network layer protocol in accordance with one or more industry standards such as transmission control protocol (TCP), user datagram protocol (UDP), and stream control transmission protocol (SCTP). It is also well-known for computing devices to utilize a transport protocol on top of the network layer protocol to transport data between computing devices, where the transport protocol is in accordance with one or more industry standard session protocols such as hypertext transfer protocol (HTTP) and Message queue telemetry transport (MQQT). In particular, it is known that MQQT may be used as a messaging protocol on top of TCP where network bandwidth is limited.

The Internet of things (IoT) is known to include an interworking of smart devices (e.g., computers, sensors, actuators) that enables the smart devices to collect and exchange machine data across existing network infrastructure to further integrate physical world entities of the smart devices into computer systems to provide benefit (e.g., lower costs, more efficiency, more accuracy, etc.). IoT example smart devices include smart thermostats networked with heating and air-conditioning systems, refrigerators that sense content and automatically order replacement food items, lighting systems that detect actual need and adjust lighting levels to reduce costs, and home environmental monitors that monitor and report flooding, smoke, and fire. Internet of things systems may include tens, hundreds, and even thousands of smart devices within a common physical area. Communication of information from thousands of co-located smart devices is known to be challenging from an organization perspective and physical communication perspective.

Such Internet of things smart devices are known to communicate smaller amounts of data as compared to general computing devices communicating the text files, audio files, multimedia files, and live data streaming. It is also known that many Internet industry standards were not optimal for utilization by IoT devices. As such, further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. It is also known that there are at least tens of variants of CoAP which provides flexibility but with added complexity (e.g., simultaneously supporting multiple software protocol agents on a single IoT smart device) and a potential for incompatibility of devices when they are unequipped to communicate in a common variant of the standard.

Computing devices (e.g., including IoT smart devices) are generally required to understand every protocol and data format from the various devices connected to the same network. Existing solutions require: (1) multiple protocol software agents on the computing device; (2) computing device-specific protocol software agents on the computing device; and/or (3) a universal translation software agent on the computing device that converts data from any protocol to a specific protocol and data format. It is also known that modifying installed base computing devices to include such multiple protocol software agents can require significant time, effort, resources, and diligence. In some cases, the complexity increases even further when computing devices are required to communicate with multiple other computing devices simultaneously on the network, where each of the other computing devices utilizes a different data protocol.

The proliferation of IoT smart devices also creates a serious challenge to security on both wireline and wireless networks. Existing identification, authentication and authorization methods used on the Internet can be bandwidth inefficient, or can sacrifice privacy and anonymity.

BRIEF DESCRIPTION OF THE SEVERAL VIEWS OF THE DRAWING(S)

DETAILED DESCRIPTION OF THE INVENTION

Figure 1:
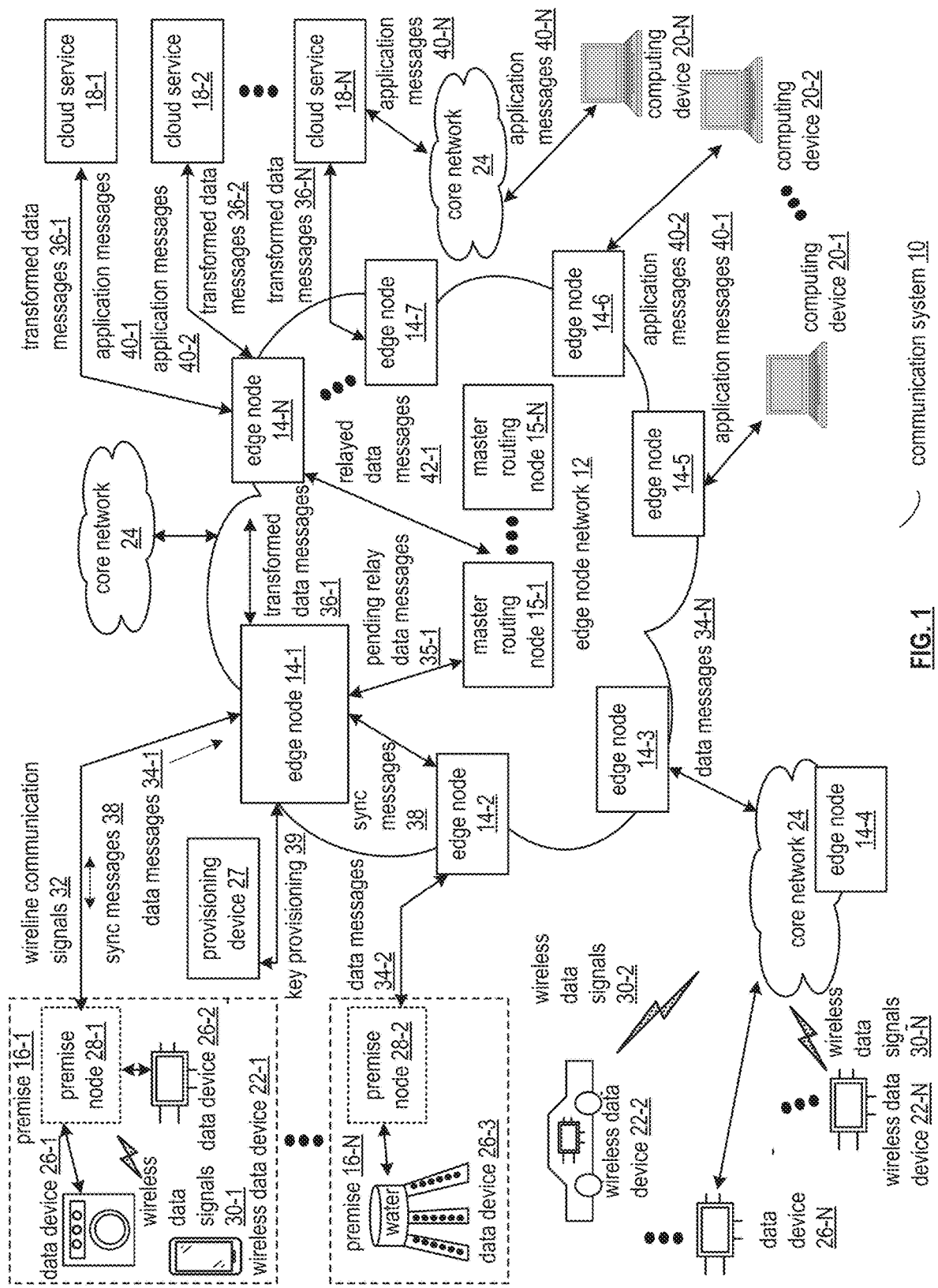
FIG. 1 is a schematic block diagram of an embodiment of a communication system in accordance with the present invention.

FIG. 1 is a schematic block diagram of an embodiment of a communication system 10 that includes an edge node network 12, a plurality of premises 16-1 through 16-N, a plurality of cloud services 18-1 through 18-N, a plurality of computing devices 20-1 through 20-N, a plurality of wireless data devices 22-1 through 22-N, at least one core network 24, a plurality of data devices 26-1 through 26-N, and a provisioning device 27. The core network includes at least one of the Internet, a public radio access network (RAN), and any private network. The cloud services 18-1 through 18-N includes a plurality of computing units, application software, storage facilities, and operational control systems to provide as a service one or more of a computing capability, an application hosting function, and a data storage function. Each cloud service may be implemented as a private enterprise system and/or as a publicly available system. Hereafter, the communication system 10 may be interchangeably referred to as a data network, a data communication network, a system, and a data communication system.

The edge node network 12 includes a plurality of edge nodes 14-1 through 14-N and may include a plurality of master routing nodes 15-1 through 15-N. Any of the edge nodes may be implemented within the core network 24 and/or may be operably coupled to the core network 24. Alternatively, each edge node and master routing node may be coupled directly to one or more other edge nodes or master routing nodes utilizing various access technologies including one or more of T-carrier/E-carrier (T1/E1), Digital Subscriber Line (DSL), Metro Ethernet, Hybrid Fiber Coax (HFC), and optical fiber, where a transport protocol such as Multiprotocol Label Switching (MPLS), Asynchronous Transport Mode (ATM), or frame relay provides communications between distant edge nodes over the access technology. Any of the premise nodes may be implemented as part of the edge node network 12. Each premise includes at least one premise node of a plurality of premise nodes 28-1 through 28-N, one or more data devices, and one or more wireless data devices. Each premise may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.).

Each data device, wireless data device, provisioning device, edge node, master routing node, premise node, and computing device includes a computing unit that includes a computing core. In general, a computing unit is any electronic device that can communicate data, process data, and/or store data. A further generality of a computing unit is that it includes a central processing unit (CPU), a memory system, a sensor (e.g., internal or external), user input/output interfaces, peripheral device interfaces, and an interconnecting bus structure.

As further specific examples, each of the data device, wireless data device, provisioning device, edge node, master routing node, and computing device may be a portable computing device and/or a fixed computing device. A portable computing device may be an embedded controller, a smart sensor, a smart pill, a social networking device, a gaming device, a cell phone, a smart phone, a personal digital assistant, a digital music player, a digital video player, a laptop computer, a handheld computer, a tablet, a video game controller, an engine controller, a vehicular controller, an aircraft controller, a maritime vessel controller, a spacecraft controller, and/or any other portable device that includes a computing core. A fixed computing device may be a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the premise node, edge node is discussed in greater detail with reference to FIG. 2. An embodiment of the data device is discussed in greater detail with reference to FIG. 3 and an embodiment of the wireless data device is discussed in greater detail with reference to FIG. 4.

Generally, the communication system 10 functions to support the processing of data, where aspects of the communication system 10 promote desirable attributes of the processing of the data including a desirable level of security of the data, a desirable level of efficiency of transporting the data, a desirable level of processing performance of the data to produce results, and a desirable level of performance of communicating the results. The processing of the data by the communication system 10 includes obtaining the data (e.g., data messages 34-1 through 34-N) from the data devices 26-1 through 26-N and wireless data devices 22-1 through 22-N, processing the data to produce transformed data messages 36-1 through 36-N, and providing the transformed data messages to corresponding cloud services 18-1 through 18-N for processing and/or storage, where the results (e.g., application messages 40-1 through 40-N) of the processing and/or storage are further accessed by the computing devices 20-1 through 20-N.

Each of the data devices and wireless data devices provides data messages of data messages 34-1 through 34-N, where the data includes one or more of sensor data from a local environment (e.g., a premise) associated with the data device and/or wireless data device, use data (e.g., statistical usage data, user identifiers, error messages, alerts, warnings, level information, etc.) associated with a mechanism (e.g., a machine, a local computer, etc.) affiliated with the data device and/or wireless data device, an interpretation of data collected from sensor data, data input by a local user of the local environment associated with the data device and/or wireless data device, data retrieved from a memory device associated with the data device and/or wireless data device, and any other data produced by the CPU of the data device and/or wireless data device.

In an example of operation of the obtaining of the data, the premise node 28-1 receives sensor data and use data from the data device 26-1 (e.g., via a wireline connection such as optical or electrical), where the data device 26-1 is associated with a washing machine in a home, and where the sensor data and use data is associated with the washing machine. Alternatively, the premise node may receive data from a wireless data device via wireless data signals. For instance, the premise node 28-1 receives wireless data signals 30-1 from the wireless data device 22-1, where the wireless data device 22-1 encodes data associated with a wireless data device 22-1 to produce the wireless data signals 30-1 for transmission to the premise node 28-1 (e.g., direct to the premise node 28-1 when the premise node 28-1 includes a wireless data signal capability, or indirect, via the core network 24, to the premise node 28-1 when utilizing a wireless data signal capability of the core network 24). The wireless data device 22-1 encodes the data in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.).

The receiving of the data may further include execution of one or more security procedures to establish a satisfactory level of trust between the data device and the premise node. The provisioning device 27 may be utilized to securely pre-provision and store security parameters in the secure processing module of data devices. The one or more security parameters includes identifying computing devices, challenging identity through authentication, producing encryption keys, securely exchanging authentication information, encrypting computing unit identifiers, and encrypting data exchanges, while preserving device anonymity when desired. For instance, the data device 26-1 and the premise node 28-1 may be securely configured with encryption information (e.g., base encryption key values), support secure identity attestation and authentication handshake methods and utilize public-private key and group shared key methods to encrypt the content of exchanges between the data device 26-1 and the premise node 28-1, where the encrypting of the content includes direct utilization of the encryption keys with an encryption algorithm.

Having received the data and the use data from the data device 26-1, the premise node 28-1 processes the received sensor data and use data to produce the data messages 34-1 in accordance with synchronization (sync) messages 38 received from the edge node network 12. Each edge node and premise node of the edge node network 12 communicates synchronization messages 38 from time to time between nodes, where the synchronization messages 38 includes one or more synchronization parameters.

The synchronization parameters include one or more of control information (e.g., how a node is to operate, i.e. as a premise node and/or as an edge node; which functions are to be included), configuration information (e.g., logical connection paths between nodes, data devices associated with a particular edge node or premise node, data devices associated with particular cloud services, data devices associated with particular applications and/or storage facilities of a particular cloud service, etc.), updated software (e.g., for premise nodes and edge nodes), security information (e.g., public-private encryption keys, key generation values, key seeds, key identifiers, encryption algorithm identifiers, updated encryption algorithms, hardware-embedded secret keys, etc.), routing information (e.g., status of routes between edge nodes, physical links between edge nodes, etc.), addressing information (e.g., identifiers of data devices and wireless data devices, identifiers of premise nodes and edge nodes, identifiers of premises, etc.), presence information (e.g., real-time status of computing units of the computing system 10, historical status information of the computing units, etc.), analytics information (e.g., data types of the data being communicated on the communication system 10, portions of data content of the data, historical patterns of the data type communication, historical usage patterns of the communication system 10 to communicate data on behalf of each data device and wireless data device, etc.), and protocol information (e.g., desired protocol(s) for an application of the plurality of applications supported by the cloud services 18-1 through 18-N, data protocol identifiers associated with the data messages 34-1 through 34-N, data protocols supported by the data devices and wireless data devices, etc.). Alternatively, at least one of the cloud services provides one or more of the synchronization parameters to the edge node network 12.

In the continuation of the example illustrating the obtaining of the data, having produced the data messages 34-1, the premise node 28-1 encodes the data messages 34-1 to produce wireline communication signals 32 in accordance with one or more wireline standards (e.g., optical, electrical) and transmits the wireline communication signals 32 to the edge node 14-1. Alternatively, a data device and/or wireless data device may transmit one or more of the data and the data messages directly to the edge node and/or indirectly via the core network 24 to the edge node. For instance, the wireless data device 22-2 encodes data to produce wireless data signals 30-2 for transmission via the core network 24 to the edge node 14-3. As another instance, the data device 26-N sends, via the network 24, the data and/or data messages 34-N (e.g., produced by the data device 26-N based on the data) to the edge node 14-3. As yet another instance, the wireless data device 22-N transmits wireless data signals 30-N, via the network 24 to the edge node 14-4, where the edge node 14-4 is embedded within a portion of the core network 24 (e.g., when the portion is associated with a radio access network), and where the data device 22-N encodes data associated with the data device 22-N to produce the wireless data signals 30-N, and the edge node 14-4 processes the received data to produce data messages 34-N for transmission to the edge node 14-3.

In an example of operation of the processing of the data, one or more nodes (e.g., premise node, edge node) of the edge node network 12 processes the received data messages 34-1 through 34-N in accordance with the synchronization messages 38 to produce transformed data messages of transformed data messages 36-1 through 36-N to satisfy requirements of one or more of the cloud services 18-1 through 18-N. The processing of the data messages includes one or more of formatting for a particular protocol, performing an interpretation, producing a summary of the data, compacting the data, correlating the data with historical data, correlating the data with real-time data from another data device, extrapolating the data to produce an extrapolation, manipulating the data in accordance with manipulation rules, filtering the data to provide a selected sub-portion, performing a timed transmission of a portion of the data, encrypting the data in accordance with security information to produce encrypted data, producing redundant data, and detecting a threshold level of at least one aspect of the data. For instance, the edge node 14-1 processes the received data messages 34-1 from the data device 26-1 in accordance with protocol information of the synchronization messages 38 to produce transformed data messages 36-1 and transformed data messages 36-2, where the transformed data messages 36-1 are in accordance with a first data application protocol and the transformed data messages 36-2 are in accordance with a second data application protocol, and where the first and second data application protocols are utilized by first and second data applications of the cloud services 18-1 and 18-2 respectively.

In an example of operation of the providing of the transformed data messages to the corresponding cloud services, having produced the transformed data messages, the corresponding edge node identifies one or more of the cloud services to receive the transformed data messages, where the identifying is based on the synchronization messages 38. For example, the edge node 14-1 identifies the cloud service 18-1 to receive the transformed data messages 36-1 when the configuration information of the synchronization messages 38 identifies that the first data application protocol is associated with a corresponding application of the cloud service 18-1 and that the data device 26-1 is affiliated with the corresponding application of the cloud service 18-1. Similarly, the edge node 14-1 identifies the cloud service 18-2 to receive the transformed data messages 36-2 when the configuration information identifies that the second data application protocol is associated with another corresponding application of the cloud service 18-2 and that the data device 26-1 is further affiliated with the other corresponding application of the cloud service 18-2.

Having identified the cloud services to receive the transformed data messages, the edge node facilitates transmission of the transformed data messages to the identified cloud services. The facilitation includes one or more of sending the transformed data messages via a plurality of the edge nodes based on the presence information and/or routing information of the synchronization messages 38 to the identified cloud services. For cases in which the edge node network 12 is deployed in a flat address space rather than a hierarchical address space, master routing nodes are deployed. In these cases, when a direct path to the destination of the transformed data messages is not known by the edge node, an edge node utilizes a master routing node of a plurality of master routing nodes to facilitate relaying the transformed data message to the correct edge node serving the destination cloud service. Master routing nodes are configured with master routing tables for all message destinations to support this relay operation.

In an example of operation of providing of the transformed data messages to the corresponding cloud services for cases in which a direct path to the destination of the transformed data messages is not known, an edge node 14-1 facilitates the forwarding of the relay pending data messages 35-1 to master routing node 15-1, which in turn utilizes the master routing table 95 to facilitate forwarding the relayed data messages 42-1 to the appropriate edge node 14-N serving the destination cloud service.

The facilitation may further include sending the transformed data via the core network 24 to the identified cloud services. In an example of sending the transformed data messages via the plurality of edge nodes, the edge node 14-1 associates the transformed data messages 36-1 with a communications path to include edge node 14-5 and edge node 14-N to communicate to the cloud service 18-1 when the presence information associated with the edge nodes 14-5 and 14-N is favorable (e.g., available with sufficient capacity for favorable performance levels) and when the routing information identifies required physical and logical paths to establish the communication path. In an example of sending the transformed data messages via the core network 24, the edge node 14-1 associates the transformed data messages 36-2 with another communications path to include the core network 24 and the edge node 14-N to communicate to the cloud service 18-2 when the presence information associated with the edge node 14-N is favorable and when the routing information identifies required physical and logical paths to establish the other communication path.

Figure 2:
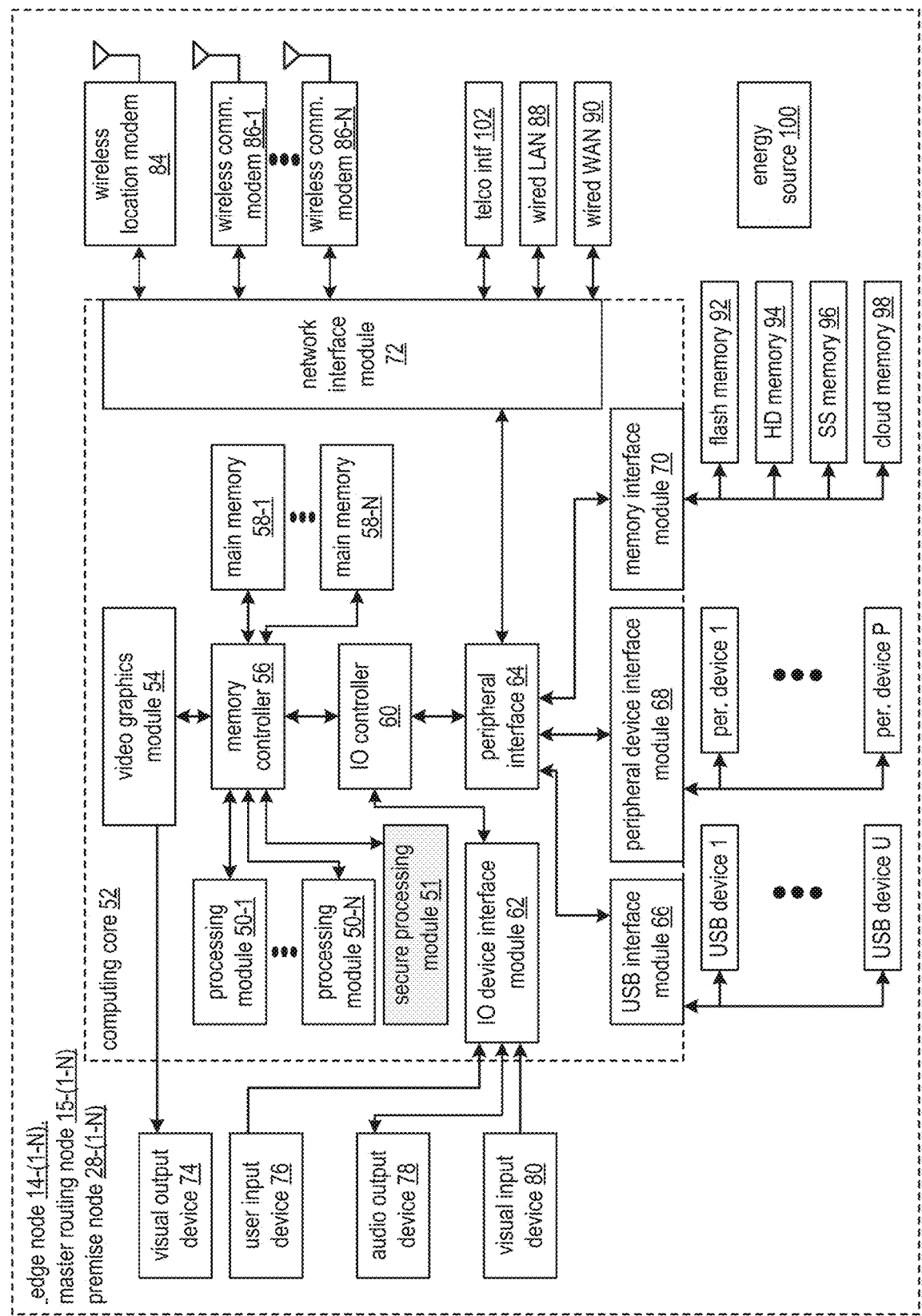
FIG. 2 is a schematic block diagram of an embodiment of an edge node of a communication system in accordance with the present invention.

FIG. 2 is a schematic block diagram of an embodiment of the edge nodes 14-1 through 14-N, the premise nodes 28-1 through 28-N, and the master routing nodes 15-1 through 15-N of the communication system 10 of FIG. 1. The edge nodes, premise nodes, and master routing nodes include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), one or more visual input devices 80 (e.g., camera, photocell, etc.), one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, one or more solid state (SS) memory devices 96, and/or cloud memory 98), one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), a wired local area network (LAN) 88 (e.g., optical, electrical), a wired wide area network (WAN) 90 (e.g., optical, electrical), and an energy source 100 (e.g., a battery, a solar power source, a fuel cell, a capacitor, a generator, mains power, backup power, etc.).

The computing core 52 includes a video graphics module 54, one or more processing modules 50-1 through 50-N, a secure processing module 51, a memory controller 56, one or more main memories 58-1 through 58-N (e.g., RAM), one or more input/output (I/O) device interface modules 62, an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the edge nodes and premise nodes. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system). In other embodiments, the premise node and/or edge node may include more or less devices and modules than shown in this example embodiment of the premise node and edge node. The computing unit may include a secure processing module 51 (e.g., Trusted Platform Module (TPM)) which is a hardware module for securely generating and storing security parameters (e.g., encryption keys) required for secure attestation and authenticated access to the edge node network 12, and cannot be tampered with by application software.

Figure 3:
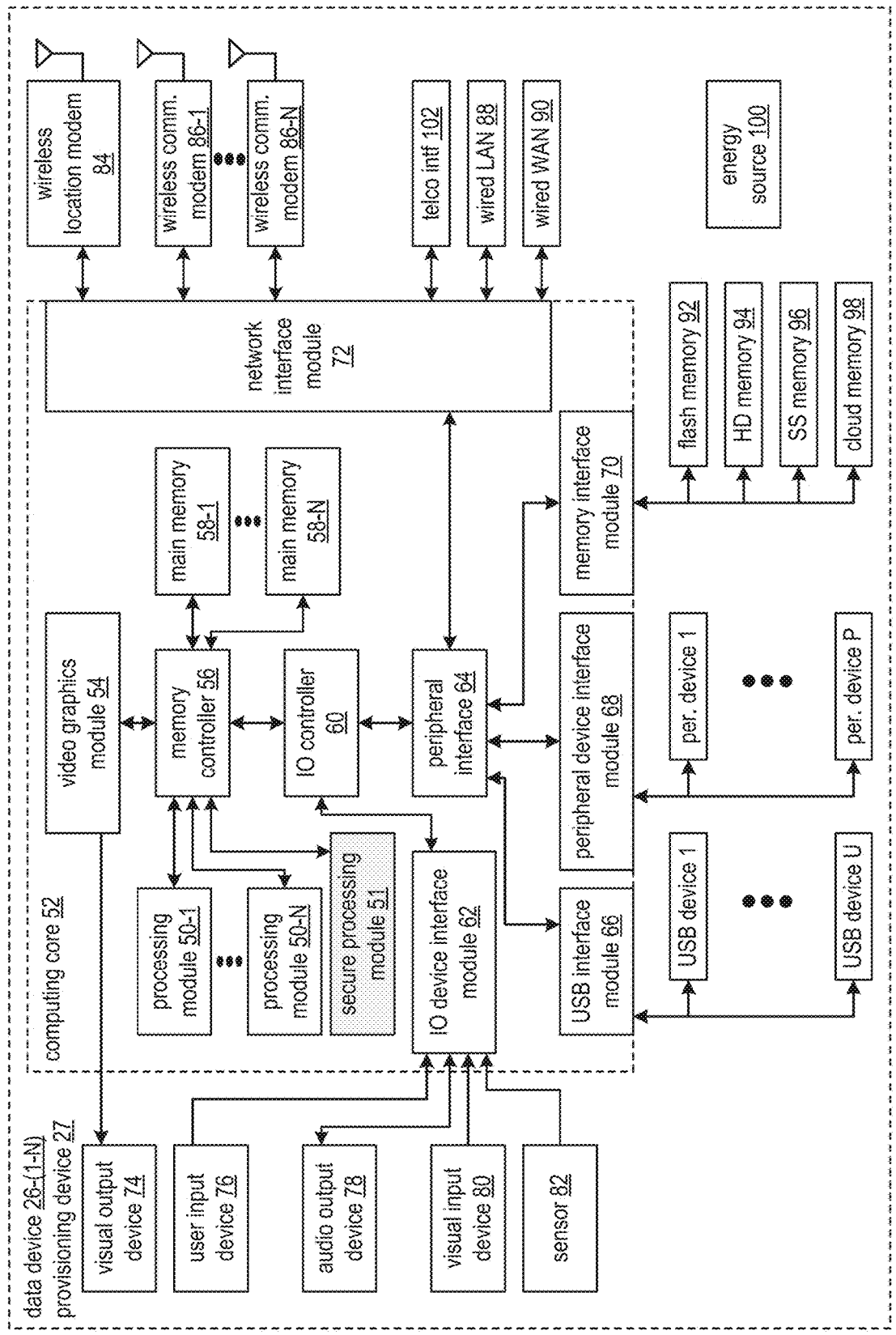
FIG. 3 is a schematic block diagram of an embodiment of a data device of a communication system in accordance with the present invention.

FIG. 3 is a schematic block diagram of an embodiment of the data devices 26-1 through 26-N and a provisioning device 27 of the communication system 10 of FIG. 1. The data devices and the provisioning device include the visual output device 74 of FIG. 2, the user input device 76 of FIG. 2, the audio output device 78 of FIG. 2, the visual input device 80 of FIG. 2, and one or more sensors 82 implemented internally and/or externally to the data device (e.g., accelerometer, velocity, compass, motion, gyro, temperature, pressure, altitude, humidity, moisture, imaging, biometric, infrared, audio, ultrasonic, proximity, magnetic field, biomaterial, radiation, weight, density, chemical, fluid flow volume, DNA, wind speed, wind direction, object detection, object identifier, motion recognition, battery level, a room temperature sensor, a sound detector, a smoke detector, an intrusion detector, a motion detector, a door position sensor, a window position sensor, a sunlight detector, medical categories: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.).

The data devices further include the computing core 52 of FIG. 2, the one or more universal serial bus (USB) devices (USB devices 1-U) of FIG. 2, the one or more peripheral devices (e.g., peripheral devices 1-P) of FIG. 2, the one or more memories of FIG. 2 (e.g., flash memories 92, HD memories 94, SS memories 96, and/or cloud memories 98), the one or more wireless location modems 84 of FIG. 2, the one or more wireless communication modems 86-1 through 86-N of FIG. 2, the telco interface 102 of FIG. 2, the wired local area network (LAN) 88 of FIG. 2, the wired wide area network (WAN) 90 of FIG. 2, and the energy source 100 of FIG. 2. In other embodiments, the data device may include more or less devices and modules than shown in this example embodiment of the data device.

Figure 4:
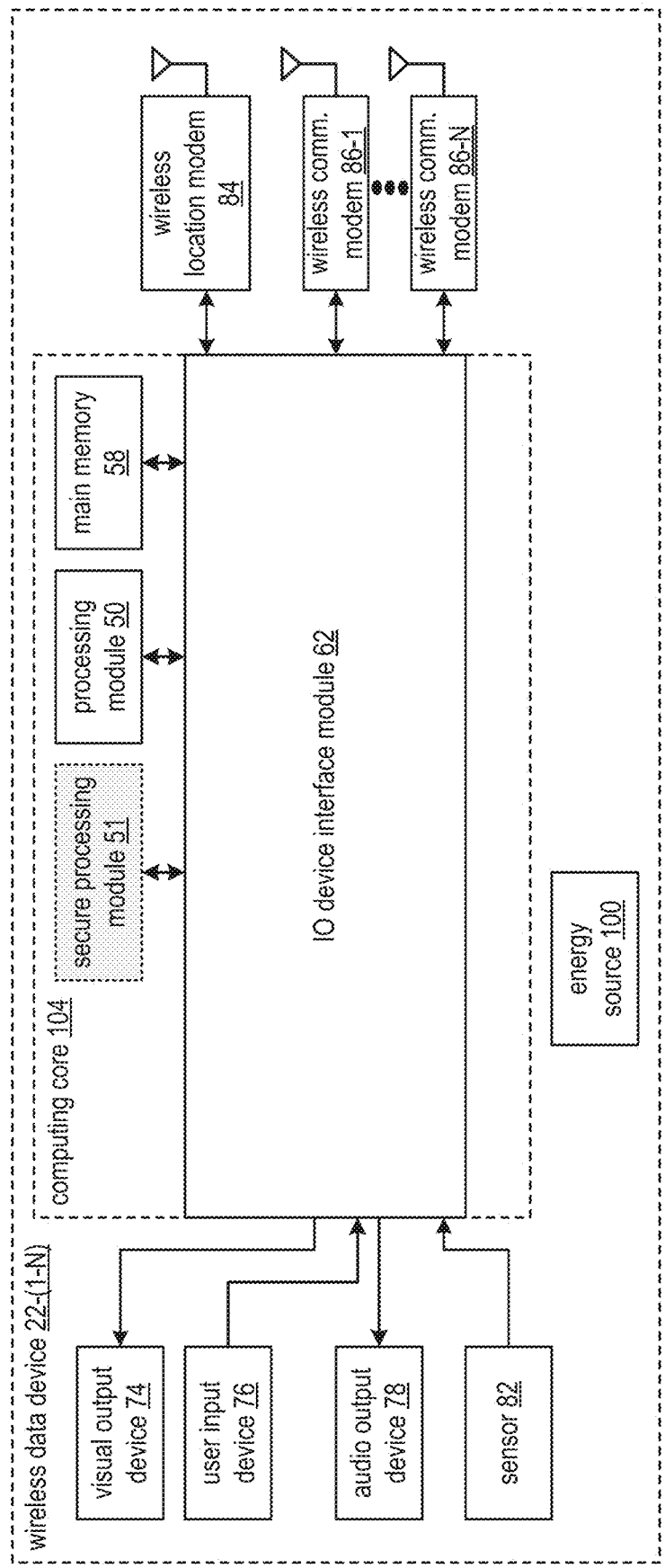
FIG. 4 is a schematic block diagram of an embodiment of a wireless data device of a communication system in accordance with the present invention.

FIG. 4 is a schematic block diagram of an embodiment of the wireless data devices 22-1 through 22-N of the communication system 10 of FIG. 1. The wireless data devices include the one or more visual output devices 74 of FIG. 2, the one or more user input devices 76 of Figure two, the one or more audio output devices 78 of FIG. 2, the one or more sensors 82 of FIG. 3, a computing core 104, the one or more wireless location modems 84 of FIG. 2, the one or more wireless communication modems 86-1 through 86-N of FIG. 2, and the energy source 100 of FIG. 2. The computing core 104 includes at least one processing module 50 of the processing modules 50-1 through 50-N and the secure processing module 51 of FIG. 2, at least one main memory 58 of the main memories 58-1 through 58-N of FIG. 2, and the I/O device interface module 62 of FIG. 2. In other embodiments, the wireless data device may include more or less devices and modules than shown in this example embodiment of the wireless data device.

Figure 5:
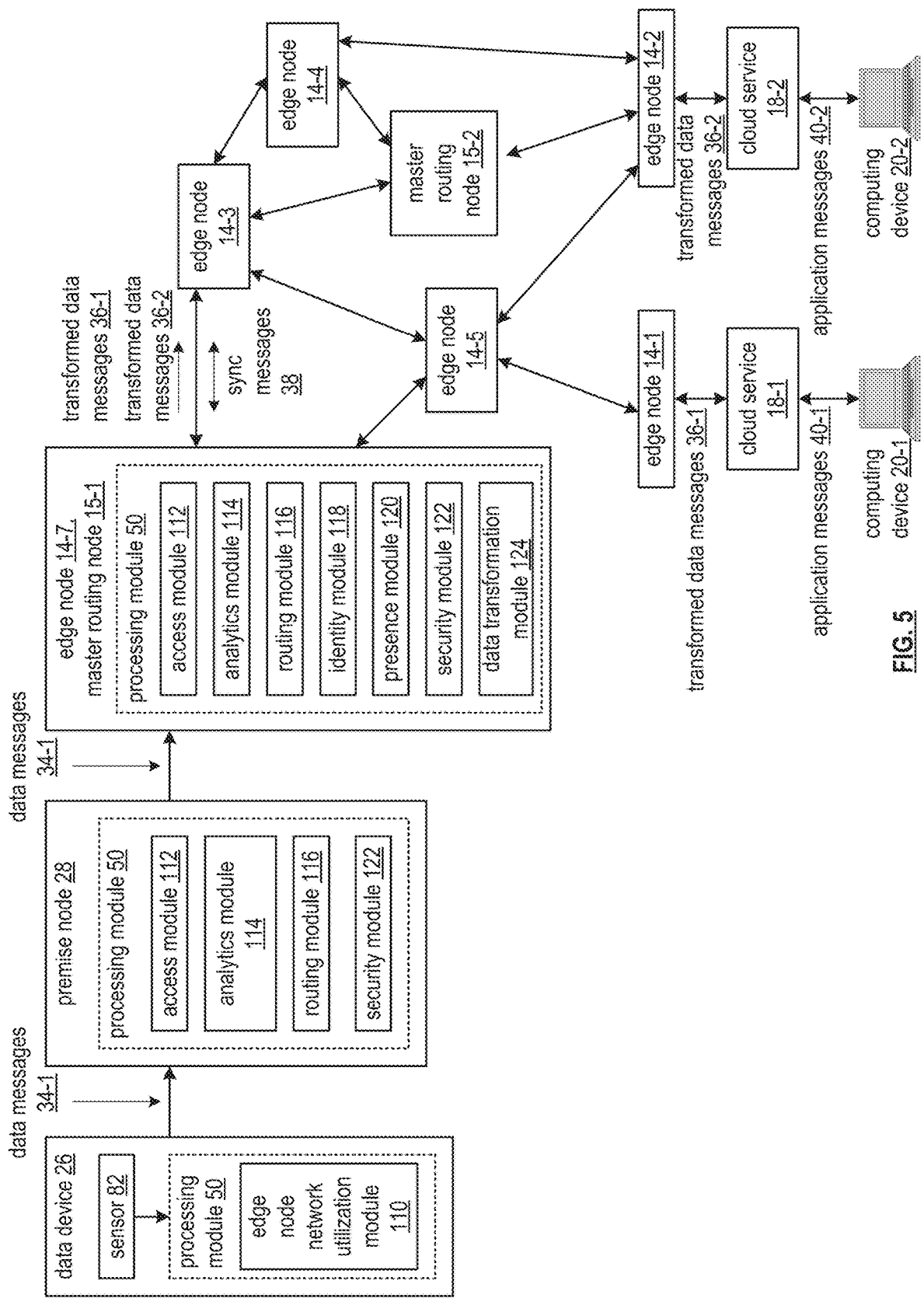
FIG. 5 is a schematic block diagram of another embodiment of a communication system in accordance with the present invention.

FIG. 5 is a schematic block diagram of another embodiment of a communication system that includes a data device 26, a premise node 28, a plurality of edge nodes 14-1 through 14-7, at least two cloud services 18-1 and 18-2, and at least two computing devices 20-1 and 20-2. The data device 26 may include one or more of the devices and the modules of the data devices 26-1 through 26-N of FIG. 3. For example, the data device 26 includes the sensor 82 of FIG. 3 and the processing module 50 of FIG. 3, where the processing module 50 of the data device 26 includes an edge node network utilization module 110. The premise node 28 may include one or more of the devices and the modules of the premise nodes 28-1 through 28-N of FIG. 2. For example, the premise node 28 includes the processing module 50 of FIG. 2, where the processing module 50 of the premise node 28 includes an access module 112, a routing module 116, a security module 122, and an analytics module 114.

Each edge node of the plurality of edge nodes 14-1 through 14-7 may include one or more of the devices and the modules of the edge nodes 14-1 through 14-N of FIG. 2. For example, each edge node 14-1 through 14-7 includes the processing module 50 of FIG. 2, where the processing module 50 of the edge nodes 14-1 through 14-7 includes the access module 112, the analytics module 114, a routing module 116, an identity module 118, a presence module 120, a security module 122, and a data transformation module 124. The edge node network utilization module 110 may include one or more of the functions associated with the edge nodes 14-1 through 14-7. For instance, the edge node network utilization module 110 includes the access module 112, the identity module 118, and the security module 122.

Generally, the modules 112-124 within the processing modules 50 of the data device 26, the premise node 28, and the edge nodes 14-1 through 14-7 process (e.g., generate, store, utilize for decision-making, transfer) the synchronization parameters previously discussed. For example, functionality of the access module 112 includes causing the processing module 50 to utilize one or more of the protocol information and the configuration information to provide physical access to other nodes and/or devices. Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge nodes.

Further examples of the processing include functionality of the identity module 118, which includes causing the processing module 50 to utilize the addressing information to identify which sensors are associated with which data devices and which data devices are to access which cloud services. Functionality of the presence module 120 includes causing the processing module 50 to utilize the presence information to optimize utilization of various edge nodes to optimize data traffic routes between the data device and a corresponding cloud service. Functionality of the security module 122 includes causing the processing module 50 to utilize the security information to authenticate a desirable and valid connection between nodes and devices and to protect confidential information exchange between the nodes and devices. Functionality of the data transformation module 124 includes causing the processing module 50 to utilize the protocol information to convert portions of the data messages into the transformed data messages to support multiple desirable attributes of the communication system including a favorable security level, a favorable efficiency level, a favorable data latency level, and a favorable compatibility level with numerous data protocols associated with data applications of the cloud services.

In an example of operation of the communication system, the edge nodes 14-1 through 14-7, the premise node 28, and the data device 26 exchange synchronization messages 38 from time to time to develop and convey the synchronization parameters. For example, at least some the edge nodes 14-1 through 14-7 convey, by exchanging with each other, at least some of the synchronization parameters to include one or more of the configuration information, the analytics information, the protocol information, the addressing information, the security information, the routing information, and the presence information. For instance, edge node 14-1 receives one or more of the synchronization patterns from the cloud service 18-1 for local storage within a memory of the edge node 14-1, where a trusted edge node control application of the cloud service 18-1 is affiliated with the plurality of edge nodes 14-1 through 14-7. In another instance, edge node 14-1 generates a synchronization message 38 to include substantially all of the synchronization parameters and transmits the synchronization message 38 to the edge node 14-6 to update the synchronization parameters stored locally within a memory of the edge node 14-6.

As another example of the developing and conveying of the synchronization parameters, at least some the edge nodes 14-1 through 14-7, the premise node 28, and the data device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the premise node 28 exchanges limited security information (e.g., to lead to generation of a common secret encryption key) with the data device 26 to further develop trusted security between the premise node 28 and the data device 26. In another instance, the premise node 28 receives configuration information from the data device 26, where the configuration information includes addressing information associated with the sensor 82, and receives companion configuration information from a data application associated with the cloud service 18-1 to match the sensor with the data application to generate further updated configuration information. In yet another instance, the edge node 14-7 monitors data messages received from the premise node 28 to generate updated analytics information based on data attributes of data within the data messages (e.g., data types, data sizes, etc.).

Having developed and conveyed a sufficient number and sufficient level of the synchronization parameters to support ongoing operations, the communication system facilitates communication of data from the sensor 82 to one or more corresponding data applications of the cloud services 18-1 and 18-2. In an example of operation of the communication of the data, having established trust and security information between the data device 26 and the premise node 28, the premise node 28 receives data messages 34-1 from the data device 26, where the edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQQT), constrained application protocol (CoAP), and data distribution service (DDS).

Having received the data messages 34-1, the premise node 28 identifies active data applications associated with the cloud services 18-1 and 18-2 that are affiliated with the data device 26 and/or the sensor 82 based on one or more of the addressing information and the configuration information. Having identified the active data applications, the premise node 28 determines at least a portion of a route for transferring data associated with the data messages 34-1 to the cloud services 18-1 and 18-2 based on one or more of the routing information and the presence information. Having determined the routing information, the premise node 28 sends the data messages 34-1 to the edge node 14-7 in accordance with the routing information.

Having received the data messages 34-1, the edge node 14-7 determines whether to convert the data messages into transformed data messages based on one or more of the configuration information, the analytics information, the addressing information, and the protocol information. For instance, the edge node 14-7 determines to convert the data messages 34-1 from the sensor data protocol into first and second data message protocols when the protocol information indicates that the first and second data protocol messages are associated with the affiliated data applications of the cloud services 18-1 and 18-2. In another instance, the edge node 14-7 determines to convert the data messages 34-1 from the sensor data protocol into a third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that cloud services 18-1 and 18-2 are compatible with the third data message protocol.

Having determined to convert the data messages 34-1, the edge node 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information. For instance, the edge node 14-7 determines an updated route to include sending the transformed data messages to the edge node 14-3 when the updated presence information and updated routing information are favorable with regards to utilizing the edge node 14-3 and sending the transformed data messages 36-1 and 36-2 to the edge node 14-3. Alternatively, the edge node 14-7 transmits the transformed data messages 36-1 and 36-2 directly to the cloud services 18-1 and 18-2 via the core network 24 of FIG. 1 when attributes of the routing information are favorable for such a route.

Having received the transformed data messages 36-1, the edge node 14-1 facilitates forwarding of the transformed data messages 36-1 to the cloud service 18-1 for utilization by the corresponding data application affiliated with the data device 26 and/or the sensor 82. Having received the transformed data messages 36-2, the edge node 14-2 facilitates forwarding of the transformed data messages 36-2 to the cloud service 18-2 for utilization by the corresponding data application affiliated with the data device 26 and/or the sensor 82. Having processed the transformed data messages 36-1, the cloud service 18-1 exchanges corresponding application messages 40-1 with the computing device 20-1. Having processed the transformed data messages 36-2, the cloud service 18-2 exchanges corresponding application messages 40-2 with the computing device 20-2.

Figure 6A:
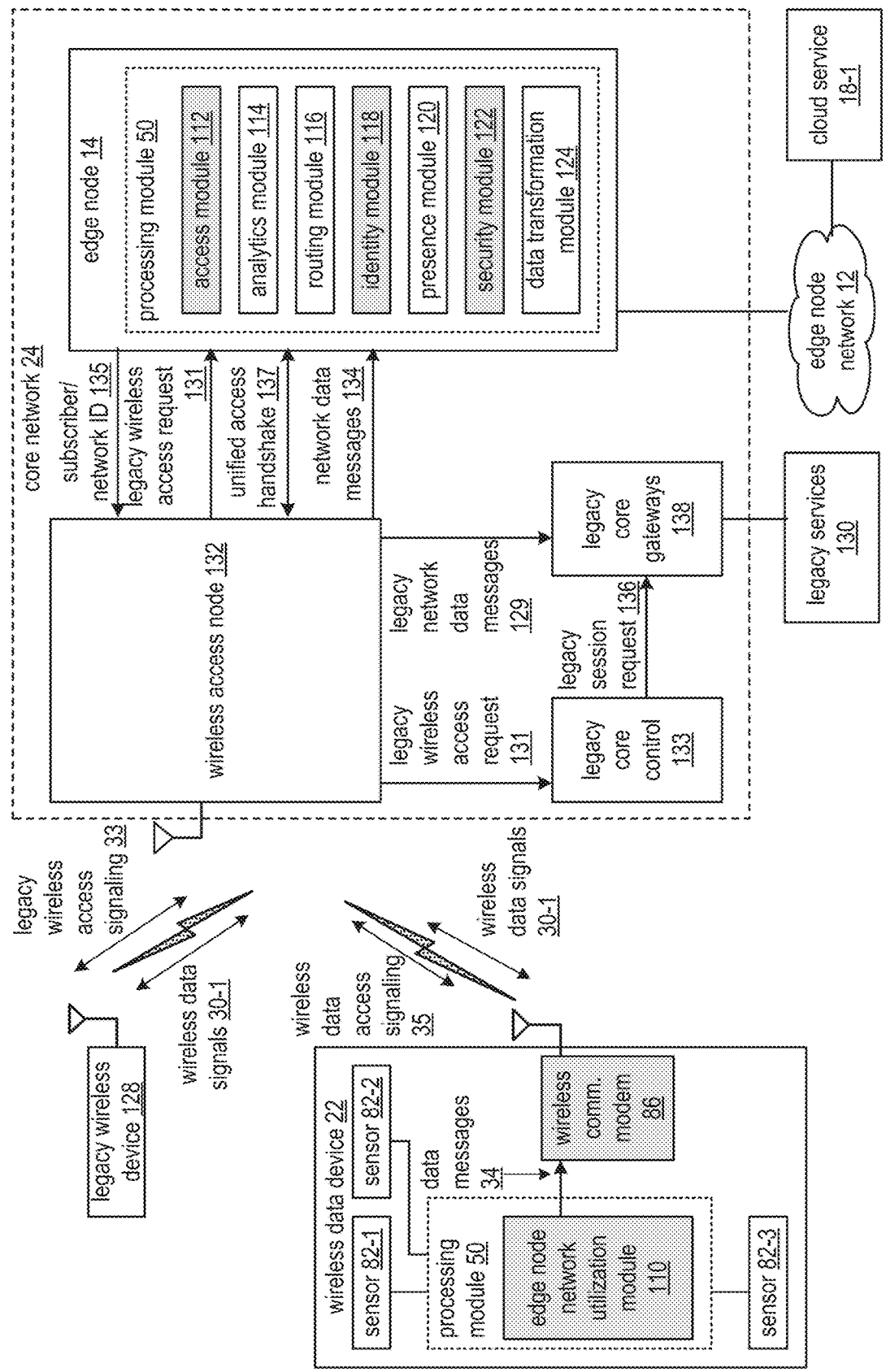
FIG. 6A is a schematic block diagram of another embodiment of a communication system in accordance with the present invention.

FIG. 6A is a schematic block diagram of another embodiment of a communication system which illustrates an example of unifying the authentication and authorization mechanism that provides secure access to both the public wireless network and the edge node network. The communication system includes a wireless data device 22, a legacy wireless device 128, the core network 24 of FIG. 1, the edge node network 12 of FIG. 1, the cloud service 18-1 of FIG. 1, and a legacy network services 130 (e.g., one or more legacy networks and servers supporting one or more legacy data applications). The wireless data device 22 may include one or more of the devices and the modules of the data devices 22-1 through 22-N of FIG. 4. For example, the wireless data device 22 includes sensors 82-1 through 82-3 implemented utilizing the sensors 82 of FIG. 3, the processing module 50 of FIG. 4, and a wireless communication modem 86 implemented utilizing at least one of the wireless communication modems 86-1 through 86-N of FIG. 4, where the processing module 50 of the wireless data device 22 includes the edge node network utilization module 110 of FIG. 5.

The core network 24 includes a wireless access node 132, a legacy core control 133, legacy core gateways 138, and an edge node 14, where the edge node 14 may include one or more of the devices and the modules of the edge nodes 14-1 through 14-N of FIG. 2. For example, the edge node 14 includes the processing module 50 of FIG. 2, where the processing module 50 of the edge nodes 14 includes the access module 112 of FIG. 5, the analytics module 114 of FIG. 5, the routing module 116 of FIG. 5, the identity module 118 of FIG. 5, the presence module 120 of FIG. 5, the security module 122 of FIG. 5, and the data transformation module 124 of FIG. 5.

The security module 122 retains the security parameters required for secure operation of the data devices with the edge node network. The one or more security parameter functions include identifying data devices, challenging identity through authentication, producing encryption keys, securely exchanging authentication information, encrypting computing unit identifiers, and encrypting data exchanges.

The wireless access node 132 of the core network 24 may include one or more wireless access facilities (e.g., a base station transceiver in a GSM network, an evolved node B in a long term evolution (LTE) network), such as in a public mobile wireless network (e.g., a cellular radio access network (RAN)). The legacy core control 133 of the core network 24 may include one or more control plane facilities of a wireless core network (e.g. Mobility Management Entity (MME) and Home Subscriber Server (HSS) of an LTE network), such as found in a public wireless network. The legacy core gateways 138 of the core network 24 may include one or more data plane facilities of a wireless core network (e.g., Serving Gateway (SGW) and Packet Data Gateway (PGW) in an LTE network, such as found in a public wireless network.

The legacy wireless device 128 may be implemented utilizing a wireless device associated with the public wireless network (e.g., a smart phone operated by a consumer subscribing to the cellular radio access network). The legacy wireless device 128 exchanges legacy wireless access signaling 33 and wireless data signals 30-1 with the wireless access node 132 in accordance with one or more public wireless network industry standards (e.g., global system for mobile communications (GSM), the LTE Uu air interface, etc.), where the core network 24 supports communications with legacy services 130 for the legacy wireless device 128. The legacy wireless device 128 initiates a legacy wireless access signaling 33 to request access to the public wireless network, where the wireless access node 132 supports these exchanges in accordance with the public wireless network standards for the wireless interface (e.g., the LTE Uu air interface between the evolved node B and wireless devices).

The wireless access node 132 converts the legacy wireless access signaling 33 into a legacy wireless access request 131 with the legacy core control 133 in accordance with one or more public wireless network standards (e.g., the S6a interface between the MME and the HSS in an LTE network). The legacy core control 133 authenticates and authorizes the access request of the legacy wireless device 128. Having successfully authenticated and authorized the request, the legacy core control 133 then initiates a legacy session request 136 to the legacy core gateways 138 to establish a session connection through the core network 24 to the legacy services 130 (e.g., a bearer channel typically utilized to interface to a packet data gateway in accordance with the S1-U interface between the evolved node B and an SGW and the S5/S8 interface between the SGW and the PGW in an LTE network.) Once the transport session is established, then the wireless access node 132 can convert wireless data signals 30-1 from legacy wireless device 128 into legacy network data messages 129 and output them to legacy core gateways 138 for communication to legacy services 130 applications.

An optimized data operation which improves bandwidth efficiency and lowers connection setup latencies is further illustrated in FIG. 6A for wireless data devices by implementing a more secure and bandwidth efficient means for unifying the two independent wireless session and network session authentication and authorization handshakes. Wireless data device 22 may be implemented utilizing a wireless device associated with the public wireless network (e.g., an Internet of Things device, or a smart phone operated by a consumer subscribing to the cellular radio access network). The wireless data device 22 exchanges wireless data signals 30-1 with the wireless access node 132 in accordance with one or more public wireless network industry standards (e.g., LTE Uu air interface, etc.), where the core network 24 supports communications with edge node network 12, which in turn supports communications with cloud service 18-1.

Wireless access node 128 is initially pre-configured with subscriber or network ID information (e.g., IMEI, IMSI, ICCID, PLMN ID, etc.) indicating that wireless data device 22 is associated with edge node network 12, and which in one embodiment can be obtained via a subscriber/network ID 135 message from edge node 14 to wireless access node 132, or in other embodiments from any other known configuration process (network management server, local configuration device, etc.) Wireless data device 22 initiates a wireless data access signaling 35 to request access to the public wireless network, and this request, in accordance with one or more public wireless network industry standards, includes a subscriber identifier. Having received the wireless data access signaling 35, the wireless access node 132 determines whether the access request originated from a wireless data device that is associated with the edge node network 12, such as wireless data device 22. The determining whether the wireless data access signaling 35 originated from a wireless data device that is associated with the edge node network 12, such as wireless data device 22, includes decoding the subscriber or network ID information in the signaling, and performing a lookup and comparison in the stored information acquired from subscriber/network ID 135 configuration messages. Having determined the request is from a wireless data device associated with edge node network 12, such as wireless data device 22, the wireless access node 132 sends the legacy wireless access request 131 to edge node 14, rather than sending the same to the legacy core control 133.

The edge node 14 receives the legacy wireless access request 131 from the wireless access node 132 of the communication system. The receiving generally includes at least one of interpreting one or more data packets from the wireless access node 132 utilizing an industry standard protocol (e.g. in accordance with the attach procedure with S1-MME protocol), and initiating, by the security module 122, a single unified authentication and authorization procedure with wireless data device 22 that establishes both the wireless access and also the transport session connection through the edge node network 12 to cloud service 18-1. The session establishment procedure may include a form of Transport Layer Security (TLS) with Direct Anonymous Attestation (DAA) handshake. Having authenticated the identity of the wireless data device 22 and authorized the service requested, security module 122 of edge node 14 initiates a unified access handshake 137 message to wireless access node 132 in accordance with industry standards for public wireless networks (e.g., Attach Accept over S1-MME protocol), which spoofs the wireless access node to indicate that separate wireless and network session authentication and bearer establishment has occurred even though the legacy wireless core has been bypassed and a unified procedure has been substituted. The wireless access node 128, then takes the spoofed acceptance indication and converts this acceptance indication to the appropriate wireless data access signaling 35 response to wireless data device 22 access request, in accordance with industry standards for public wireless data networks (e.g., Non-Access Stratum (NAS) protocol over Uu air interface in LTE networks).

Having established the wireless access and network transport session connections, data may be exchanged between the wireless data device 22 and the one or more data applications executing on one or more servers of cloud service 18-1, by bypassing the legacy core gateways 138, whereby the wireless access node 132 outputs network data messages 134 to edge node 14 in accordance with the public wireless network industry standard (e.g., a bearer channel over an S1-U interface between the evolved node B and edge node 14). Edge node 14 terminates the public wireless network industry standard (e.g., the S1-U interface) and may utilize at least one of the TLS family of interface protocols to forward the network data messages 134 through the edge node network 12 and to the intended cloud service 18-1.

Figure 6B:
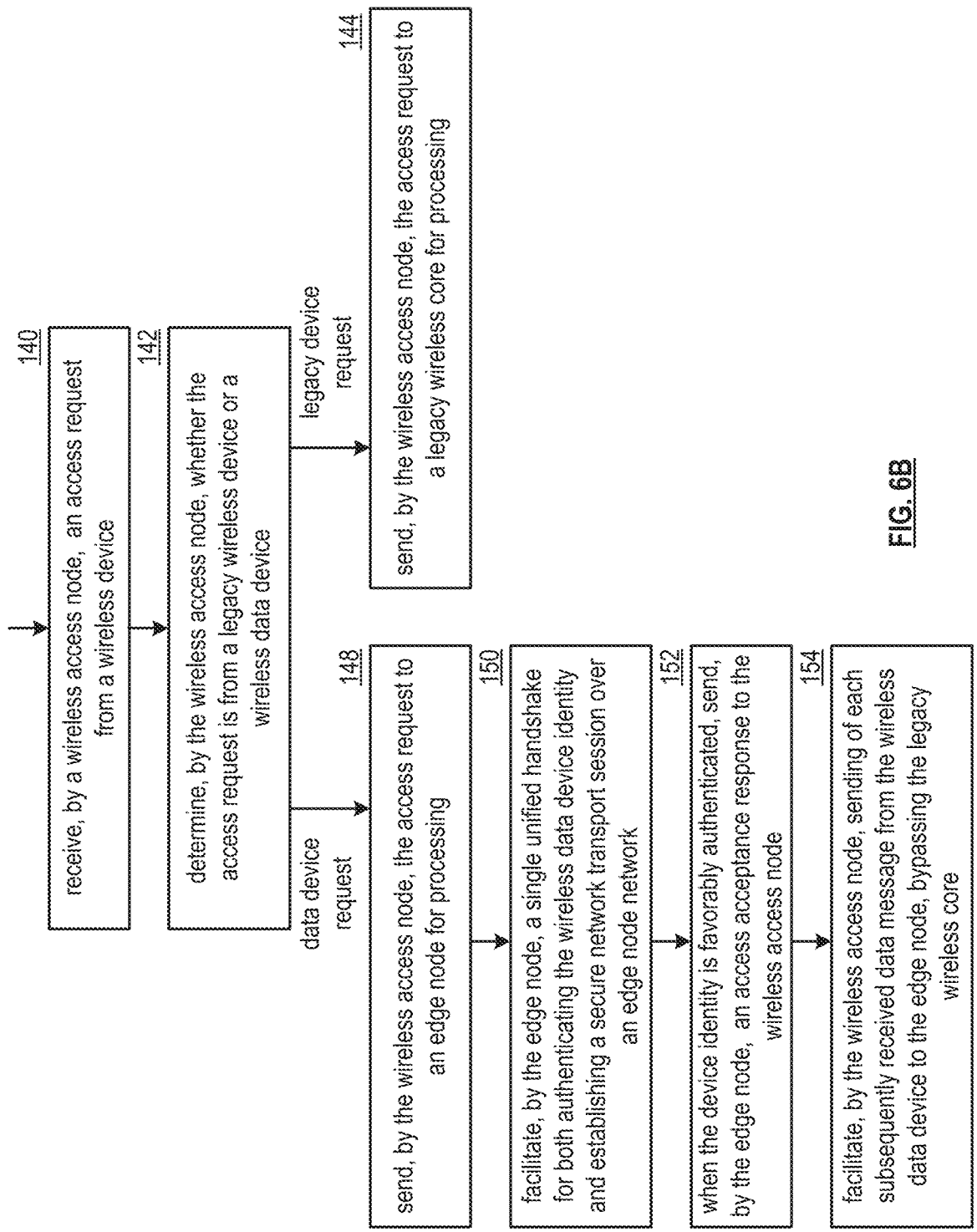
FIG. 6B is a logic diagram of an embodiment of a method for efficiently authenticating and signaling a wireless data device in accordance with the present invention.

FIG. 6B is a logic diagram of an embodiment of a method for unifying the authentication and authorization mechanism that provides secure access to both the public wireless network and the edge node network. In particular, a method is presented for use in conjunction with one or more functions and features described in conjunction with FIGS. 1-5, 6A, and also FIG. 6B. The method includes step 140 where a wireless access node (e.g., an evolved Node B in an LTE network) receives an access request message from a legacy wireless device or a wireless data device of the communication system. The receiving of the access request message includes interpreting one or more data signals from the legacy wireless device or the wireless data device that may be utilizing a radio air interface protocol (e.g. the LTE NAS over Uu protocol). The receiving of the access request message may further include one of obtaining the wireless device identification information that will allow the wireless access node to associate the wireless device with an associated transport network. As a specific example of the obtaining, the processing module extracts the identification information as International Mobile Equipment Identity (IMEI), or International Mobile Subscriber Identity (IMSI) or Integrated Circuit Card identifier (ICCID) or Public Land Mobile Network Identifier (PLMN ID) received from a wireless access request over a public wireless air interface. As another specific example, the processing module associates the wireless device with an associated transport network from a memory location lookup associated with the computing unit.

The method continues at step 142 where the wireless access node determines whether the access request message is from a legacy wireless device or a wireless data device. The determining whether the access request message is from a legacy wireless device or wireless data device may be accomplished by at least two approaches. A first approach includes comparing the wireless device identifier in the access request message to a pre-configured table of known identifiers for wireless data devices which may be based on IMEI, IMSI, ICCID, or PLMN ID. A second approach includes comparing the wireless device identifier in the access request message to a table of known wireless data device identifiers received in a message or set of messages from an edge node, a network management server, or a local configuration device.

The method branches to step 148 when the wireless access node determines that the access request message originated from a wireless data device. The method continues to step 144 when the wireless access node determines that the access request message did not originate from a wireless data device, and therefore originated from a legacy wireless device.

When the access request message originated from a legacy wireless device, the method continues at step 144 where the wireless access node sends the access request message to a legacy wireless core for further standard protocol processing. For example, the sending includes utilizing standard public wireless network protocols (e.g., NAS over S1-MME protocol between the evolved Node B and the MME of an LTE network).

When the access request message originated from a wireless data device, the method continues at step 148 where the wireless access node bypasses the legacy wireless core and sends the access request message to an edge node. For example, the sending includes utilizing standard public wireless network protocols (e.g., NAS over S1-MME protocol between the evolved Node B and the MME of an LTE network).

The method continues at step 150, where the edge node, facilitates a single unified handshake for both authenticating the wireless data device identity attestation and establishing a secure network transport session over an edge node network. For example, the facilitating includes utilizing an optimized Transport Layer Security handshake together with Direct Anonymous Attestation based authentication protocols.

The method continues at step 152, where upon successfully authenticating the wireless data device identity attestation and establishing the network transport session with a single unified handshake, the edge node sends an access acceptance response to the wireless access node. For example, the sending includes utilizing standard public wireless network protocols (e.g., NAS over S1-MME protocol attach accept message between the evolved Node B and the MME of an LTE network).

The method continues at step 154 where the wireless access node sends subsequently received data messages from wireless data device to the edge node, bypassing the legacy wireless core. For example, the sending includes utilizing an optimized Transport Layer Security handshake together with Direct Anonymous Attestation based authentication protocols between the wireless data device and the edge node network.

Figure 7A:
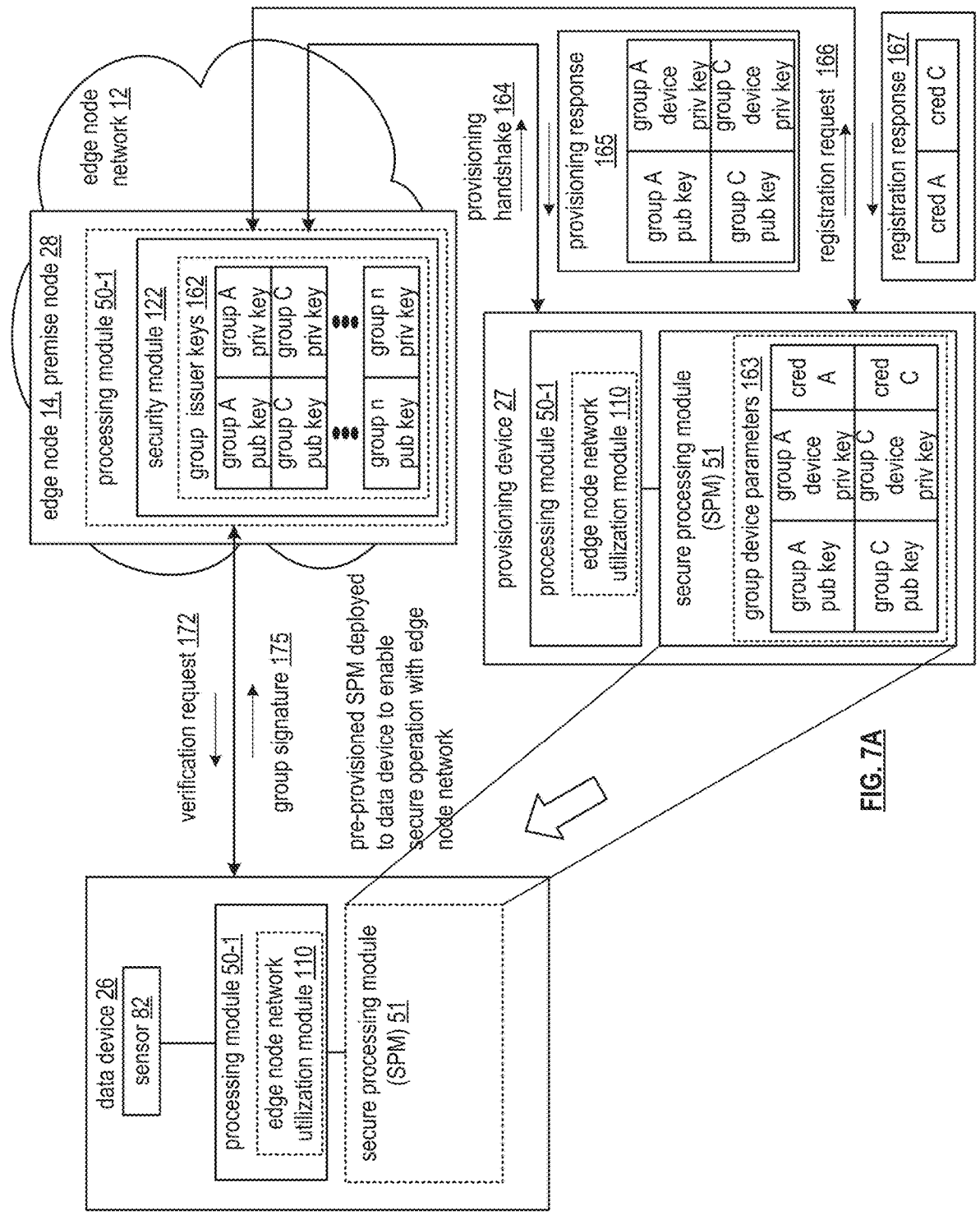
FIGS. 7A and 7B are schematic block diagrams of additional embodiments of a communication system in accordance with the present invention.
Figure 7B:
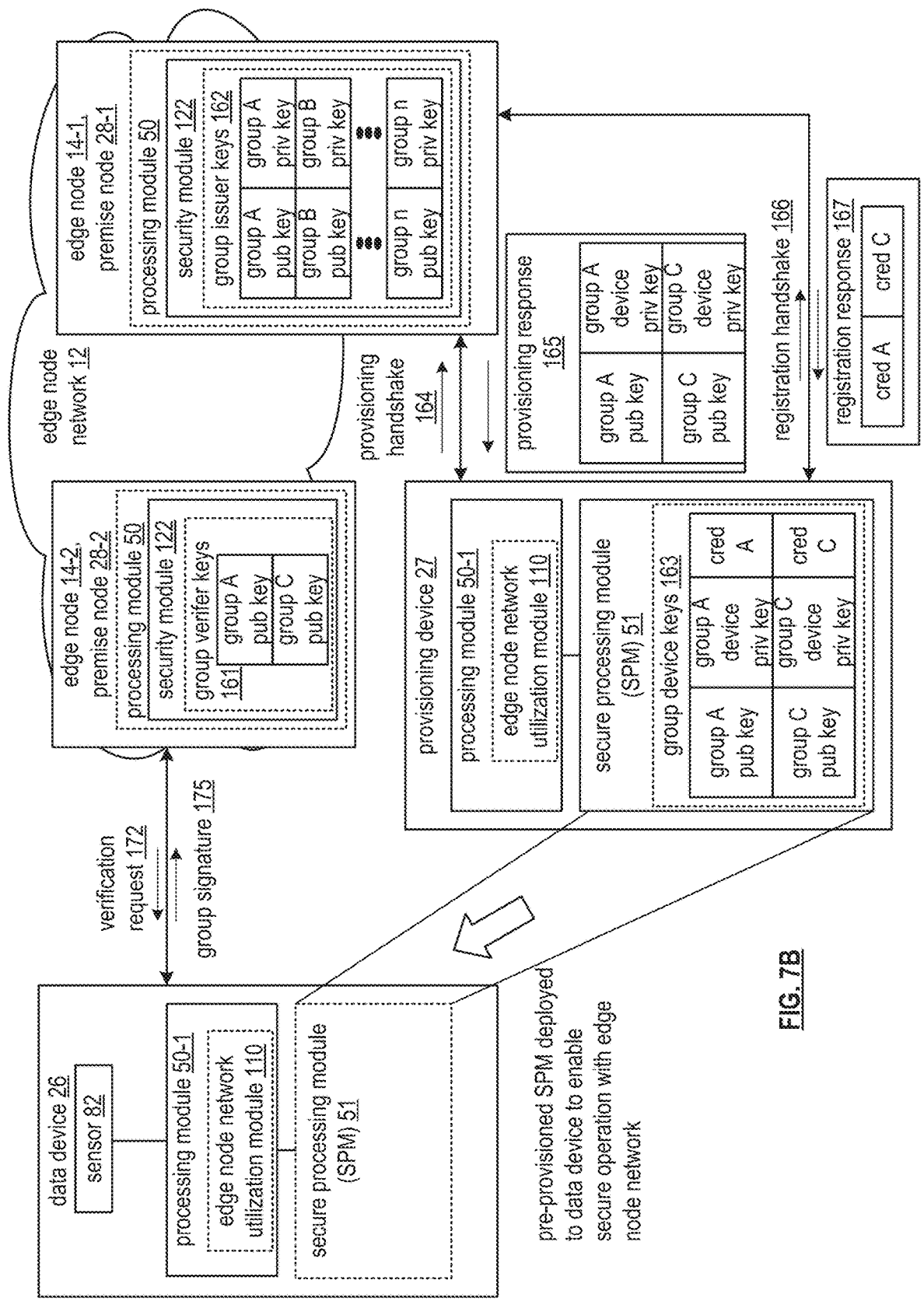

FIGS. 7A and 7B are schematic block diagrams of another embodiment of a communication system that illustrates the pre-provisioning of a secure processing module prior to the deployment of the module in a data device (e.g., IoT device) in order to securely provide the data device with the necessary security parameters for anonymous attestation and authenticated access to an edge node network. Through the pre-provisioning of the secure processing module that later will be installed in a fielded data device, the system can ensure secure transfer of the security parameters while retaining the individual anonymity of the fielded data device, other than what group to which it belongs. The system includes a data device 26 of FIG. 1, a provisioning device 27 of FIG. 1, and the edge node network 12 of FIG. 1.

The data device 26 may include one or more of the data devices and the modules of the data devices 26-1 through 26-N of FIG. 3. For example, the data device 26 includes sensor 82 of FIG. 3, a processing module 50 of FIG. 3, the edge node network utilization module 110 of FIG. 5, and a removable secure processing module 51 of FIG. 4. The provisioning device 27 may include one or more of the modules of the provisioning device 27 of FIG. 3. For example, the provisioning device 27 includes a processing module 50 of FIG. 3, the edge node network utilization module 110 of FIG. 5, and a removable secure processing module 51 of FIG. 4.

The edge node network 12 includes either an edge node 14 of FIG. 1 or a premise node 28 of FIG. 1, as either can be utilized interchangeably. Edge node 14 or premise node 28 may include one or more of the edge nodes or premise nodes and the modules of the edge nodes 14-1 through 14-N of FIG. 2 and premise nodes 28-1 through 28-N of FIG. 2, respectively. For example, the edge node 14 or premise node 28 includes the processing module 50 of FIG. 2, where the processing module 50 of the edge node 14 or premise node 28 includes the security module 122 of FIG. 5. Hereafter for FIG. 7A, the term edge node or premise node may be used interchangeably and will refer to both node types.

The security module 122 retains the security parameters required for secure operation of the data devices with the edge node network. The one or more security parameter functions include identifying data devices, challenging identity through authentication, producing encryption keys, securely exchanging authentication information, encrypting computing unit identifiers, and encrypting data exchanges, while preserving device anonymity when desired. For instance, the data device 26 and the edge node 14 may be securely configured with encryption information (e.g., base encryption key values), support secure identity attestation and authentication handshake methods and utilize public-private key and group shared key methods to encrypt the content of exchanges between the data device 26 and the edge node 14, where the encrypting of the content includes direct utilization of the encryption keys with various encryption algorithms.

As an example of the operation of this embodiment, a provisioning device 27 is operably coupled to edge node 14, and through edge node 14 to the rest of the edge node network 12, with provisioning device 27 serving as a temporary placeholder for each specific data device that will undergo pre-provisioning. A removable secure processing module (SPM) 51 (e.g., a Trusted Platform Module (TPM)) is installed within the computing core of the provisioning device 27. The SPM contains some initial encryption key pairs (e.g., Endorsement Key (EK) and Storage Root Key (SRK) pairs) and SPM specific identifiers that are used for identity authentication in the provisioning phase to acquire shared group keys used for secure network access. The cryptographic handshakes utilized throughout this example for the registration and verification phases may vary, although a form of Direct Anonymous Attestation (DAA) is used in this example in which the attestation keys are generated and signed to form group signature that validate that the identity belongs to a group member, without providing the verifier with the individual identity of the data device, thus preserving the anonymity of the data device.

In this example the provisioning device is serving as a placeholder for data device 26, and as such the provisioning device is initially configured with the group identifiers for one or more networks and application services for which the data device 26 will require secure access. This configuration step can be accomplished by utilizing a user interface, a configuration file, or from various other known methods of configuration (e.g., network management server messages, local configuration terminal).

In the provisioning phase, provisioning device 27 utilizes the computing core 52, processing module 50-1, edge node network utilization module 110, and the secure processing module 51 to initiate the encrypted handshakes in this example. Provisioning device 27 initiates a provisioning handshake 164 to edge node 14 that includes the configured group identifiers for the one or more networks or application services that the target data device 26 will be required to access. In this example, the provisioning handshake was configured to enable access as a member of groups A and C, at least one of which corresponds to a group of data devices, of which data device 26 will be one, requiring access to edge node network 12. Security module 122 of processing module 50-1 within edge node 14 (e.g., acting as a DAA issuer) authenticates the provisioning handshake 164 and performs a table lookup in group issuer keys 162 to determine if the requested groups have ever been provisioned previously. If the group had never been provisioned the edge node generates a public-private pair of group keys (e.g. DAA keys) for each group requested for access and appends this to group issuer keys 162. The edge node also generates a private key specific to the intended data device 22 for each requested group access. Edge node 14 responds to the successful provision handshake 164 with a provisioning response 165 message that includes the group public key and the device-specific private key for each group requested. Provisioning device 27 securely stores these keys in group device keys 163 in the SPM.

In the registration phase, having completed the successful provisioning of group encryption keys (e.g. DAA keys), provisioning device 27 initiates a registration handshake 166 to edge node 14, utilizing the SPM encryption keys from the previous provisioning phase. Having successfully authenticated the handshake, edge node 14 sends a registration response 167 from which provisioning device 27 can retrieve credentials for group A (cred A) and C (cred C), and these credentials are stored in group device keys 163 within the SPM, rather than wrapped in an SRK encryption and retained in processing module 50 of the provisioning device 27.

The SPM, being pre-provisioned with the required security parameters, is deployed on data device 26 to enable access as a member of group A or group C to edge node network 12. Edge node network utilization module 110 of processing module 50 extracts a copy of the credentials for group A (cred A) and C (cred C) from the SPM where they were only temporarily stored.

In the verification phase, when data device 26, equipped with the pre-provisioned SPM, is coupled to edge node network 12, edge node 14 may send a verification request 172 message to data device 26 in order to authenticate the access of the device to the edge node network 12. In other cases the data device 26 may initiate the identity attestation. In either case the data device 26 utilizes processing module 50-1, edge node network utilization module 110, and the secure processing module (SPM) 51 encryption keys, including the appropriate credential acquired in the registration phase, to sign either an attestation key (e.g., AIK) generated by the SPM, or a separate message. This forms the group signature 175 message that is sent by data device 26 to edge node 14. To enable network access, the security module 122 within edge node 14, operates as a DAA verifier in this phase, by utilizing the group public key, from within group issuer keys 162, that corresponds to the group identified in the group signature message, to verify the validity of the credential which was utilized to form the group signature.

FIG. 7B further illustrates the pre-provisioning of a secure processing module prior to the deployment of the module in a data device (e.g., IoT device) in order to securely provide the data device with the necessary security parameters for anonymous attestation and authenticated access to an edge node network. In particular in this embodiment, the edge node 14 or premise node 28 functionality described in FIG. 7A, is now split between edge node 14-1 or premise node 28-1, and edge node 14-2 or premise node 28-2. Hereafter for FIG. 7B, the term edge node and premise node may be used interchangeably and will apply to both node types. In this embodiment, edge node 14-1 provides the functionality that had been attributed to edge node 14 in FIG. 7A for the provisioning and registration phases, while edge node 14-2 provides the verification phase functionality attribute to edge node 14 in FIG. 7A. This separation allows these phases to be allocated to distinct administrative entities, and further enhances the device anonymity since the edge node 14-2, acting as verifier for the network and application service providers, has no knowledge of the provisioning or registration phases, which can be allocated to a third entity trusted by both the data device 26 owner and the edge node 14-2 network and application service provider.

Figure 7C:
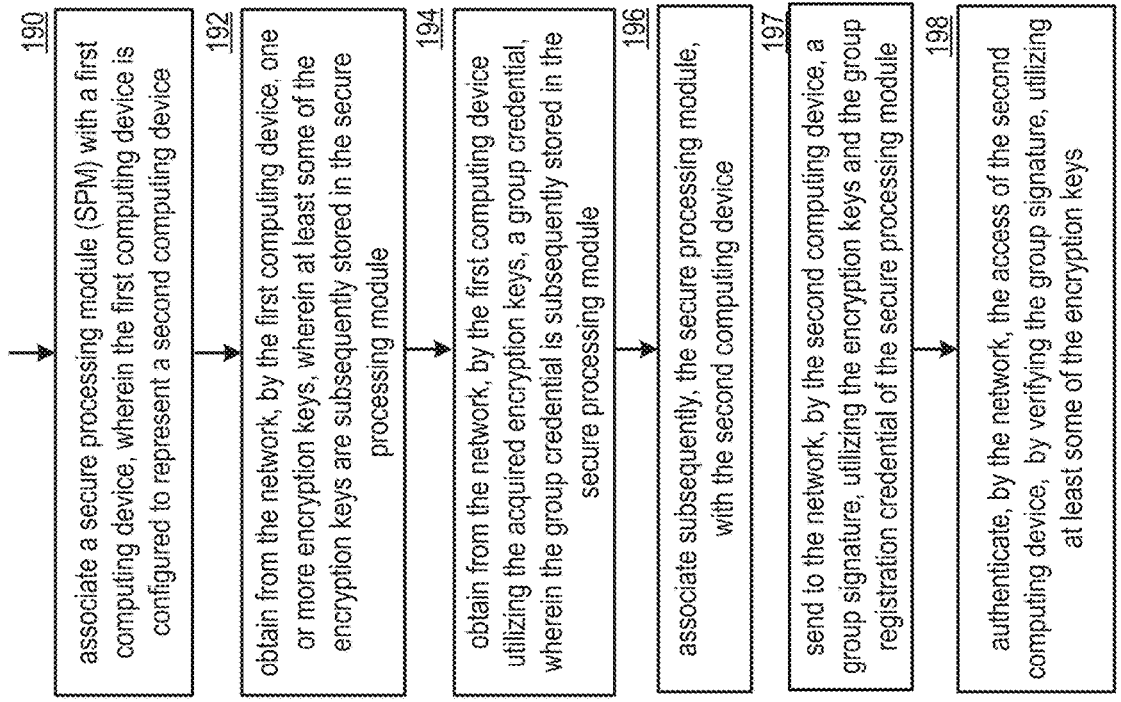
FIG. 7C is a logic diagram of an embodiment of a method for securely pre-provisioning and distributing group identity and authentication encryption keys in accordance with the present invention.

FIG. 7C is a logic diagram of an embodiment of a method for pre-provisioning of a secure processing module prior to the deployment of the module in a data device (e.g., IoT device) in order to securely provide the data device with the necessary security parameters for anonymous attestation and authenticated access to an edge node network. In particular, a method is presented for use in conjunction with one or more functions and features described in conjunction with FIGS. 1-5, 7A, and also FIG. 7B. The method includes step 190 where a secure processing module (e.g., TPM) associates with a first computing device (e.g. a provisioning device) of the communication system, where the first computing device is configured to represent a second computing device (e.g., a data device) for purposes of pre-provisioning the second computing device for access to a network (e.g., edge node network). The associating of the secure processing module (SPM) with the first computing device includes physically attaching the SPM with the first computing device. As a specific example of the attaching, a removable SPM may be installed within a provisioning device, where the SPM can later be removed. The configuring of the first computing device to represent the second computing device includes programming the provisioning device with the identifiers for the one or more groups that the intended data device will later join the network as a member. As a specific example of the configuring, the provisioning device includes similar hardware and can be programmed via user interface, network management or local terminal, with an SRK generated from the EK of the SPM, and also with the group identifiers associated with the networks and application services to be accessed by the intended data device.

The method continues at step 192 where the first computing device obtains, from the network, security parameters, including one or more encryption keys required to access the network, and stores at least some of these security parameters in the secure processing module. The obtaining of these security parameters includes performing a secure provisioning handshake with the network, wherein the handshake validates the identity of the secure processing module. As a specific example of the obtaining, the provisioning device sends a provisioning request containing the group identifiers and encrypted with the EK/SRK of the SPM, and sends this request to an edge node of the edge node network, whereupon the edge node authenticates the SPM identity using the public keys of the EK/SRK pairs known only to the edge node network, and generates the appropriate DAA group keys for the groups requested in response to the provisioning device.

The method continues at step 194 where the first computing device, utilizing the encryption keys, obtains from the network in step 192, a group credential required to access the network, and subsequently stores this credential in the secure processing module. The obtaining of the group credential includes performing a secure registration handshake with the network, wherein the handshake validates the identity of the first computing device as a member of an authorized group while preserving the anonymity of the individual device, and the network responds with a valid group credential that the first computing device subsequently stores in the SPM temporarily. As a specific example of the obtaining, the provisioning device may perform the join protocol handshake, according to one of the DAA methods, with the edge node of the network, by using the DAA group key obtained in step 192, and in response receives a group credential from the edge node within the edge node network, which is operating as a DAA issuer.

The method continues at step 196 where the pre-provisioned SPM is subsequently associated with a second computing device (e.g., the intended data device). The associating with a second computing device includes removing the SPM from the first computing device and physically attaching the SPM to the second device at some later time. As a specific example of the associating, the SPM would be removed from the provisioning device and later installed within the intended data device for which network access is required.

The method continues at step 197 where the second computing device sends to the network a group signature (e.g. anonymous attestation signature) utilizing the encryption keys and the group credential extracted from the SPM and temporarily stored in the SPM from the previous steps. The sending a group signature includes the second computing device responding to a verification request from an edge node of the edge node network, or the second computing device accessing the edge node network without a verification request. As a specific example of the sending, the data device may utilize the sign protocol of one of the DAA methods, in which an AIK is generated by the SPM and utilized with the group credential received in step 194 in forming the group signature. As another specific example of the sending, the data device may utilize the sign protocol of one of the DAA methods, which also allows a message, rather than an AIK, to be utilized with the group credential acquired in step 194 in forming the group signature.

The method continues at step 198 where the network authenticates the access of the second computing device to the network by verifying the group signature, utilizing at least some of the encryption keys. The authenticating the access of the second computing device to the network includes the edge node of the network receiving the group signature and decrypting the contents using the public key corresponding to a group for which access has been pre-provisioned/registered. As a specific example of the authenticating, the edge node or premise node of the edge node network, may operate as the DAA verifier, utilizing the sign protocol of one of the DAA methods, in validating the group signature of the data device.

Figure 8A:
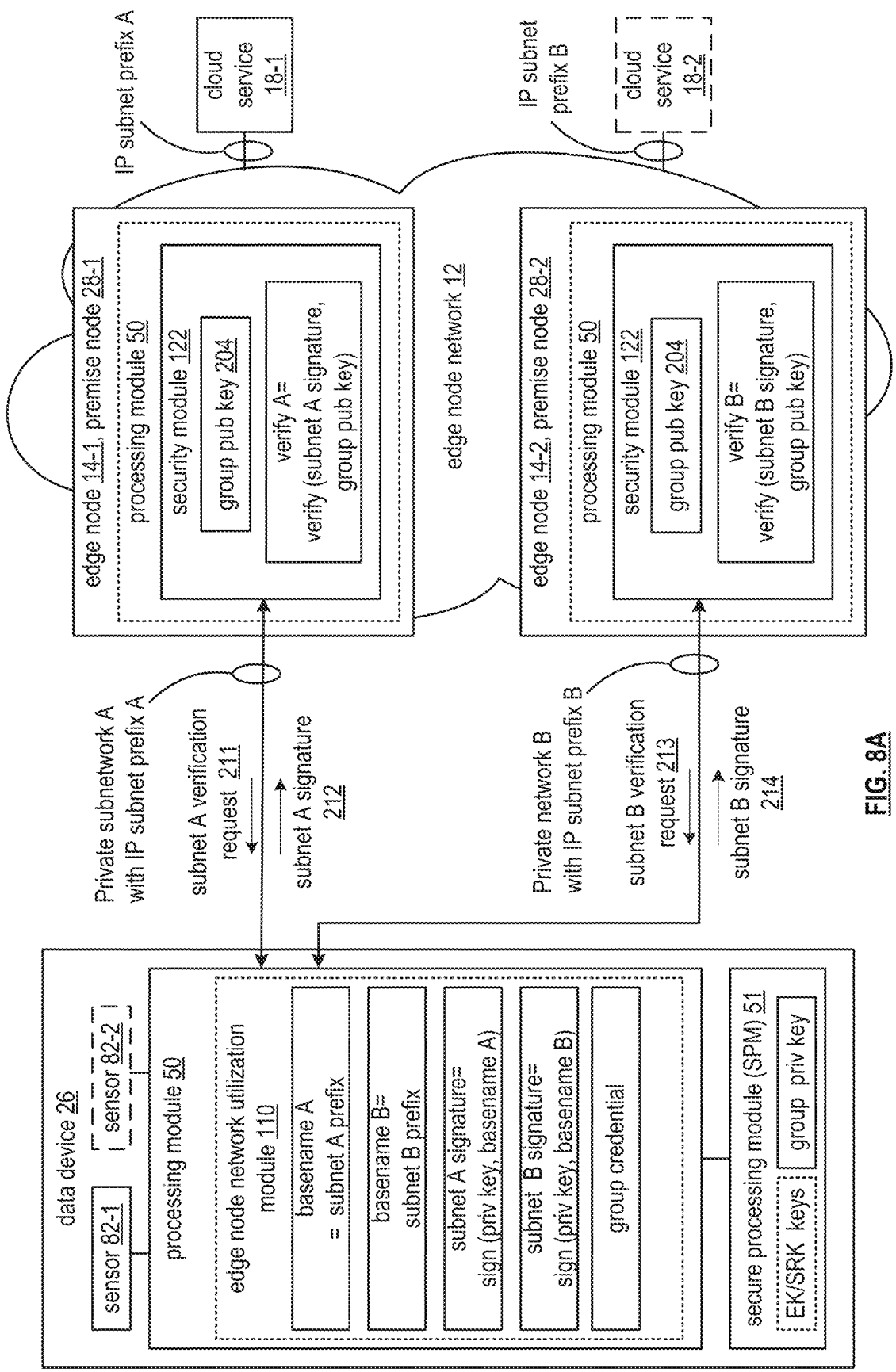
FIG. 8A is a schematic block diagram of another embodiment of a communication system in accordance with the present invention.

FIG. 8A is a schematic block diagram of another embodiment of a communication system that illustrates how private subnet identifiers used as the basename in group signatures (e.g., anonymous attestation signatures) simplifies the management of secure static identities of data devices across multiple private subnetworks. The system includes data device 26 of FIG. 1, edge node network 12 of FIG. 1, and cloud services 18-1 and 18-2 of FIG. 1.

The data device 26 may include one or more of the devices and the modules of the data devices 26-1 through 26-N of FIG. 3. For example, the data device 26 includes the processing module 50 of FIG. 3, where the processing module 50 of the data device 26 includes an edge node network utilization module 110 of FIG. 5, sensors 82-1 and 82-2 of FIG. 6A, and optionally a secure processing module 51 of FIG. 3.

The edge node network 12 includes either an edge node 14 of FIG. 1 or a premise node 28 of FIG. 1, as either can be utilized interchangeably. Edge node 14 or premise node 28 may include one or more of the edge nodes or premise nodes and the modules of the edge nodes 14-1 through 14-N of FIG. 2 and premise nodes 28-1 through 28-N of FIG. 2, respectively. For example, the edge node 14 or premise node 28 includes the processing module 50 of FIG. 2, where the processing module 50 of the edge node 14 or premise node 28 includes the security module 122 of FIG. 5. Hereafter for FIG. 8A, the term edge node or premise node may be used interchangeably and will refer to both node types.

The edge node network 12 may be serving at least two private subnetworks with edge node 14-1 serving at least subnetwork A, identified by Internet protocol (IP) subnet prefix A, and edge node 14-2 serving at least subnetwork B, identified by IP subnet prefix B. The overall system is set up to support authentication using anonymous attestation protocols (e.g., DAA), in which group signatures are used to verify device identities to a verifier entity, with edge node 14-1 assigned as the verifier for subnetwork A, and edge node 14-2 assigned as the verifier for subnetwork B.

Initially equipped with sensor 82-1, data device 26 intends to provide sensor data messages over subnetwork A to cloud service 18-1 which supports sensor 82-1, and therefore the date device is operably coupled to edge node 14-1 which is serving subnetwork A. Before messages can be accepted on subnetwork A, the data device must be verified by subnetwork A. The data device utilizes the anonymous attestation protocol (e.g. DAA) with a unique group signature that is verifiable by the network edge nodes using only a shared group public key, while allowing a signer, the data device, to selectively maintain its individual anonymity within the group of other data devices that may be part of that administrative group. Edge node network utilization module 110 of processing module 50 possesses a group credential and a group private key which are necessary to create the unique group signature that identifies the data device as a valid group member for the subnetwork, the group credential having been acquired through a provisioning and registration/join process as described for various DAA methods. Secure processing module 51 (e.g., a Trusted Platform Module) of data device 26 is also leveraged to securely generate the group signatures.

When sensor 82-2, which is intended to provide sensor data messages over subnetwork B to cloud service 18-2, is added to data device 26, the device must now achieve secure network access to subnetwork B in addition to subnetwork A. As the two subnetworks are private (physically or virtually), the data device would be required to be re-provisioned and re-registered for an additional group and would need to acquire an additional device group (DAA) private key and the associated credential. Also the edge node operating as DAA verifier for subnetwork, such as edge node 14-2, would require the additional group public key in order to verify the second set of group signatures to be used. As additional sensors are added with their application running on cloud services attached to separate private subnetworks, additional sets of group keys would be required.

The solution to resolve this problem involves uniquely leveraging the basename field within the message body of the group signatures to separately identify and validate subnetwork A and subnetwork B devices while using a single set of group keys, and to avoid having to establish an additional group key set for each private subnetwork that a data device has to access. With this approach, data device 26 achieves group signature verification over subnetwork A, by having edge node network utilization module 110 assigns basename A to include a portion, or in its entirety, the IP subnet prefix of subnetwork A. The basename A is then used as part of the message content that is signed to generate the subnet A signature 212 to edge node 14-1. The sending of a subnet A signature 212 message may be predicated on reception of subnet A verification request 211 from edge node 14-1 requesting the use of basename A, or may be initiated by the data device itself. Upon receiving subnet A signature 212, edge node 14-1 is able to verify the group signature of data device 26 by using the shared group public key 204 to recover the valid basename A value as the subnet prefix for subnetwork A.

Similarly, data device 26 achieves group signature verification over subnetwork B, by having edge node network utilization module 110 assigns basename B to include a portion, or in its entirety, the IP subnet prefix of subnetwork B. The basename B is then used as part of the message content that is signed to generate the subnet A signature 214 to edge node 14-2. The sending of a subnet B signature 214 message may be predicated on reception of subnet A verification request 213 from edge node 14-2 requesting the use of basename B, or may be initiated by the data device itself. Upon receiving subnet A signature 214, edge node 14-1 is able to verify the group signature of data device 26 using the same shared group public key 204 to recover the valid basename B value as the subnet prefix for subnetwork B.

Group signatures made using the same basename can be linked as coming from the same signer, whereas signatures using different basenames remain anonymous, such that edge node 14-1 and 14-2 operating as DAA verifiers for subnetwork A and subnetwork B, respectively, are unable to tell that the same member of the group created the signatures, thus preserving device anonymity between the two private subnetworks. With this method, a given data device, such as data device 26, need only maintain a single group private key, and a given DAA verifier, such as edge nodes 14-1 and 14-2 need only obtain a single group public key, while the group signatures for joining two different private subnetworks cannot be linked to each other. Further, if a data device desires to join a new private subnetwork, re-provisioning of new cryptographic keys is not required and only the new subnet prefix must be communicated to the data device.

Figure 8B:
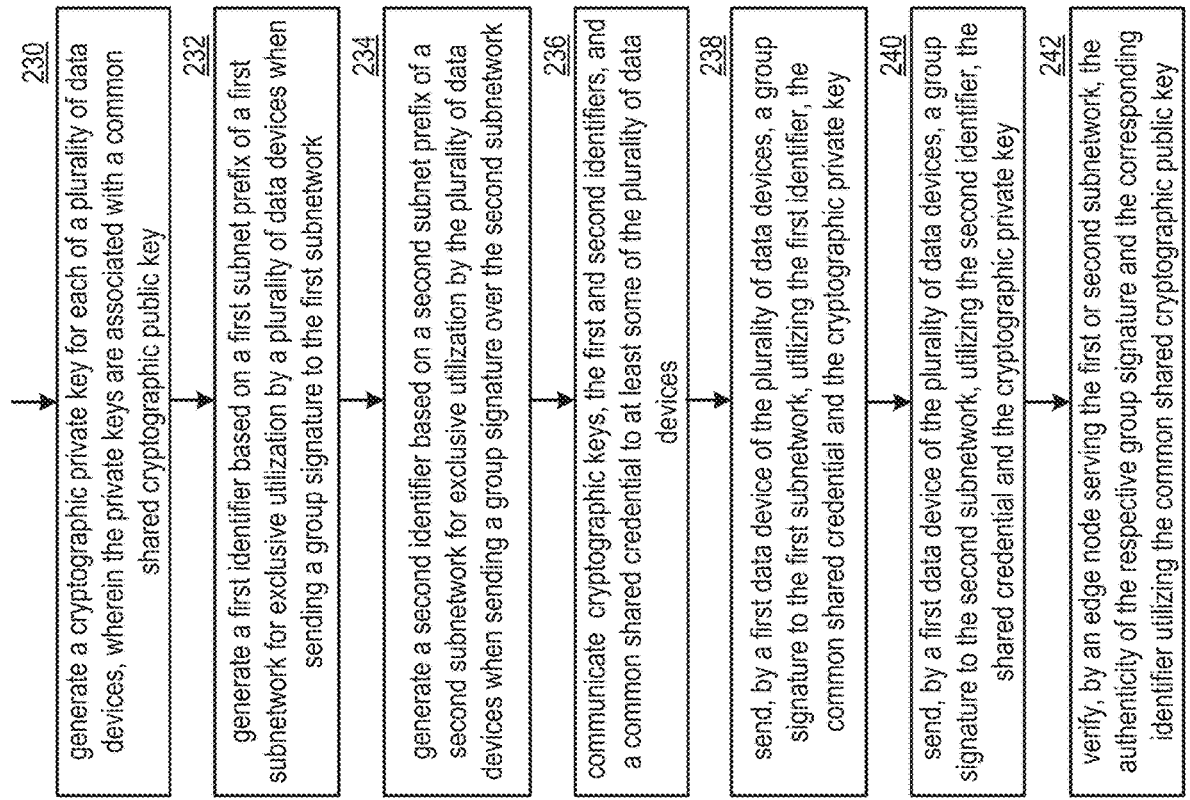
FIG. 8B is a logic diagram of an embodiment of a method for simplifying group identity and authentication across multiple private/virtual edge node networks in accordance with the present invention.

FIG. 8B is a logic diagram of an embodiment of a method for using private subnet identifiers as the basename in group signatures (e.g., anonymous attestation signatures) to simplify the management of secure static identities of data devices across multiple private subnetworks. In particular, a method is presented for use in conjunction with one or more functions and features described in conjunction with FIGS. 1-5, 7A,7B and also FIG. 8A. The method includes step 230 where a processing module of a computing device (e.g., of an edge node) generates a cryptographic private key for each of a plurality of data devices, where the private keys are associated with a common shared cryptographic public key. The generating of the cryptographic keys includes enabling an anonymous attestation capability. As a specific example of the generating, the computing device may follow the procedure described by various DAA methods.

The method continues at step 232 where the computing device generates a first identifier based on a first subnet prefix of a first subnetwork for exclusive utilization by a plurality of the data devices when sending a group signature to the first subnetwork. The generating of the first identifier includes configuring a first subnetwork with a specific subnet prefix utilized for data message routing, and utilizing all or a portion of the IP subnet prefix as all or a portion of the first identifier. As a specific example of the generating, the first subnetwork may employ Internet protocol routing standards which have a well-defined subnet prefix defined by the most significant bit group in their IP address, and which can be used as the basis for the first identifier.

The method continues at step 234 where the computing device generates a second identifier based on a second subnet prefix of a second subnetwork for exclusive utilization by a plurality of the data devices when sending a group signature to the second subnetwork. The generating of the second identifier includes configuring a second subnetwork with a specific subnet prefix utilized for data message routing, and utilizing all or a portion of the IP subnet prefix as all or a portion of the second identifier. As a specific example of the generating, the second subnetwork may employ Internet protocol routing standards which have a well-defined subnet prefix defined by the most significant bit group in their IP address, and which can be used as the basis for the second identifier.

The method continues at step 236 where a network computing device (e.g., an edge node) communicates the cryptographic keys, the first and second identifiers, and a group credential to at least some of the plurality of data devices. The communicating of the cryptographic keys, identifiers, and credential by the computing device includes utilizing known secure methods for provisioning and registering/joining anonymous attestation groups. As a specific example of the communicating, the computing device may employ the portions of the method described in FIG. 7C that result in the data device acquiring the necessary cryptographic keys and credential necessary to perform anonymous attestation via group signatures to a network or subnetwork, while additionally appending the first and second identifiers in the content sent to the data device in the described provisioning phase.

The method continues at step 238 where a first data device of the plurality of data devices sends a group signature to the first subnetwork, incorporating the first identifier in the message content that is encrypted and signed using the private key and the group credential of the data device. The sending of a group signature to this first subnetwork includes responding to a verification request by the computing device (e.g., an edge node) which requests the use of the first identifier in the group signature (e.g., signed anonymous attestation), or alternatively initiating the signed anonymous attestation message without verification request. As an example of the signing, the data device may incorporate the first identifier as the basename in a DAA verify handshake protocol.

The method continues at step 240 where a first data device of the plurality of data devices sends a group signature to the second subnetwork, incorporating the second identifier in the message content that is encrypted and signed using the private key and the group credential of the data device. The sending of a group signature to this second subnetwork includes responding to a verification request by the computing device (e.g., an edge node) which requests the use of the second identifier in the group signature (e.g., signed anonymous attestation), or alternatively initiating the signed anonymous attestation message without verification request. As an example of the signing, the data device may incorporate the second identifier as the basename in a DAA verify handshake protocol.

The method continues at step 242, where a network computing device (e.g., an edge node) serving the first or second subnetwork, verifies the authenticity of the respective group signature by utilizing the common shared cryptographic public key. The verifying of the group signatures includes assigning to one or more of the edge nodes serving a particular subnetwork the verification task and providing those edge nodes with the common shared cryptographic public key required to decrypt and authenticate the group signatures, including validating the group credential and recovering the corresponding identifier for the specific subnetwork. As a specific example of the verifying, the edge node may operate as a DAA verifier and support one or more of the DAA verify protocols, to both verify a valid group credential and recover the corresponding IP subnet prefix, associated with subnetwork A or subnetwork B, within the basename field of the group signature (e.g. signed anonymous attestation or DAA sign message).

The method described eliminates the need for substantial secure re-provisioning of the data devices each time a data device introduces a cloud service that must be communicated with and which operates on a separate private network, while preserving the anonymity of the device from the perspective of the two private subnetwork operators and the cloud services associated with those private subnetworks.

Figure 9A:
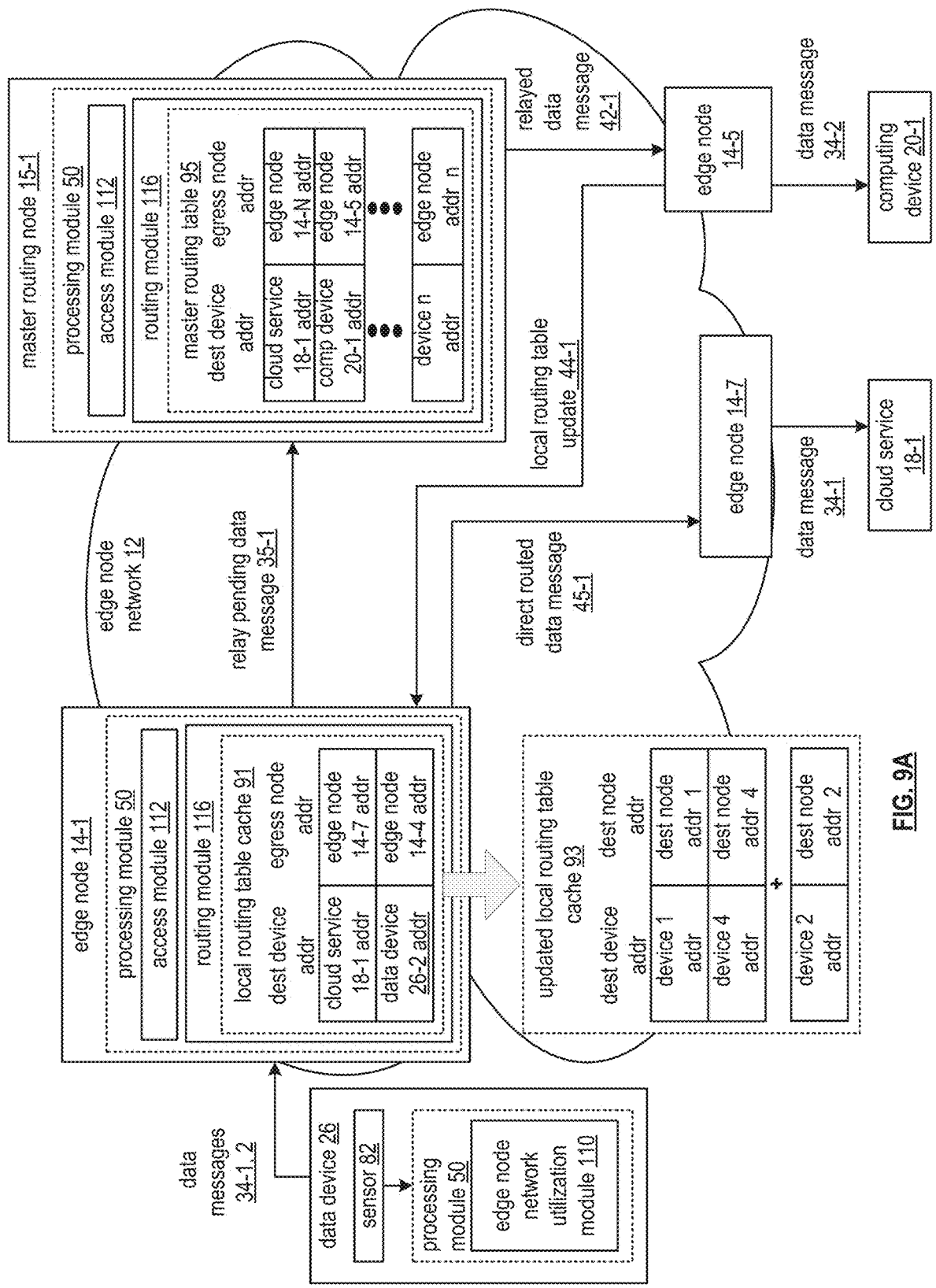
FIG. 9A is a schematic block diagram of another embodiment of a communication system in accordance with the present invention.

FIG. 9A is a schematic block diagram of another embodiment of a communication system which illustrates an example of scalable flat routing of network devices to better enable IoT device deployment. The system includes data device 26 of FIG. 5, edge node network 12 of FIG. 1, cloud service 18-1 of FIG. 1, and computing device 20-1 of FIG. 1.

The data device 26 may include one or more of the devices and the modules of the data devices 26-1 through 26-N of FIG. 3. For example, the data device 26 includes the sensor 82 of FIG. 3 and the processing module 50 of FIG. 3, where the processing module 50 of the data device 26 includes an edge node network utilization module 110.

Edge node network 12 includes edge nodes 14-1, 14-5 and 14-7 of FIG. 1, and master routing node 15-1 of FIG. 1. Edge nodes 14-1, 14-5 and 14-7 may include one or more of the devices and the modules of the edge nodes 14-1 through 14-N of FIG. 2; for example, including the processing module 50 of FIG. 2, where the processing module 50 of the edge nodes includes the access module 112 and the routing module 116 of FIG. 5. Master routing node 15-1 may include one or more of the devices and the modules shown in FIG. 2; for example, including the processing module 50 of FIG. 2, where the processing module 50 of the edge nodes includes the access module 112 and the routing module 116 of FIG. 5.

The edge node network 12 is configured with a flat addressing scheme, rather than a standard hierarchical addressing scheme that IP networks typically use with subnetworking and advanced routing protocols. Each edge node, of the plurality of edge nodes, is operating at a peer level with every other edge node from an addressing perspective. Edge nodes still operate on IP packets, but implement a virtual LAN type operation that enables layer 2-like data transfers between edge nodes.

The inherent requirement for routing and latency efficiency in a flat addressing scheme is that every ingress edge node knows the appropriate egress edge node that is serving the ultimate destination data device or service for which a data message is intended. In the absence of a traditional routing protocol between edge nodes, there is a need for a novel method for efficiently sharing routing information that improves scalability and reduces network latency. The edge node network leverages a hierarchical routing method utilizing at least one master routing node to achieve this.

In an example of operation of the communication system, a data device 26, utilizing edge node network utilization module 110 of processing module 50, sends data message 34-1, containing data from sensor 82, and destined to cloud service 18-1, to edge node 14-1. The sending, by data device 26, includes attaching a destination address for cloud service 18-1 on the inner IP header of the message and a MAC address for the edge node 14-1 on the outer header of the message, consistent with standard IP and LLC/MAC networking procedures. The receiving of data message 34-1, by edge node 14-1, includes the access module 112 of processing module 50 obtaining the final destination address from the inner header (e.g., IP address header) of the data message, and requesting the address of the edge node serving the cloud service 18-1 address from routing module 116 for that destination. The determining of the next hop, by routing module 116, may include a table lookup in local routing table cache 91, which results in obtaining a network address for edge node 14-7 which would serve as the egress edge node for cloud service 18-1.

Having determined the edge node address, edge node 14-1 forwards data message 34-1 to edge node 14-7 for which it has a direct physical connection. The forwarding includes using the address of edge node 14-7 on the outer header of the message, which may be implemented as a VLAN address. Edge node 14-7 receives the message and forwards this to its intended destination, cloud service 18-1, again changing the outer header according to standard networking practice.

As a further example of the operation of the communication system, data device 26 sends data message 34-2, containing data from sensor 82, and destined to computing device 20-1, to edge node 14-1. The sending, by data device 26, includes attaching a destination address for computing device 20-1 on the inner header (e.g., an IP header) of the message and a MAC address for the edge node 14-1 on the outer header of the message, consistent with standard IP and LLC/MAC networking procedures. The receiving of data message 34-2, by edge node 14-1, includes the access module 112 of processing module 50 obtaining the final destination address from the inner header of the data message, and requesting, from routing module 116, the address of the edge node serving that destination. The determining of that edge node address, by routing module 116, may include a table lookup in local routing table cache 91, which results in a failure to find an egress edge node entry corresponding to the address of computing device 20-1.

Having determined that there is no edge node address to directly forward the data message, edge node 14-1 forwards data message 34-2 as a relay pending data message 35-1 to master routing node 15-1 for which it has a direct destination address, having been provisioned in all edge nodes. The forwarding includes using the address of master routing node 15-1 on the outer header of the message, which may be implemented as a VLAN address.

The receiving, by the master routing node, of the data message 34-2, as a relay pending data message 35-1, triggers two actions by the master routing node. The first action being that the access module 112 includes a request to the master routing module 116 to provide an egress edge node address for computing device 20-1. The determining of the egress edge node address serving computing device 20-1 includes a lookup in master routing table 95 by routing module 116, and given that the master routing node is provisioned with every device address, results in the address for edge node 14-5. The second action is to trigger the master routing node to retain the address of the sourcing edge node which had to relay the message.

Having determined the edge node destination address, master routing node 15-1 marks the data message with a relay indication and the address of the original sourcing edge node by forwarding the data message 34-2 as a relayed data message 42-1 directly to edge node 14-5. The forwarding includes attaching the a MAC address for the edge node 14-5 on the outer header of the original data message 34-2, consistent with standard IP and LLC/MAC networking procedures.

The receiving of the data message 34-2 as a relayed data message 42-1 by edge node 14-5 triggers the edge node 14-5 to send a local routing table update 44-1 to the sourcing edge node 14-1 to enable the routing module 116 to create an updated local routing table cache 93 that adds an additional entry that allows future data messages destined for computing device 20-1 which ingress at edge node 14-1 to be direct routed to edge node 14-5. This local routing table update occurs whenever an edge node serves to reduce the number of data messages that must be relayed through a master routing node.

Previous approaches to flat routing have suffered from lack of scalability as the edge node network grows and new edge nodes are introduced into the network, or as external devices move, both of which prevent all the edge nodes from knowing the proper routes to destination devices. The master routing node 15-1 is utilized to address these issues by maintaining a master routing table 95 that keeps track of all the routes to destination device addresses, and further to provide a relay function for those edge nodes that do not know the route for the destination device address presented to them. The local cache update message from the egress edge node that is sent to the ingress edge node when relaying has occurred, also improves scalability and latency performance.

Figure 9B:
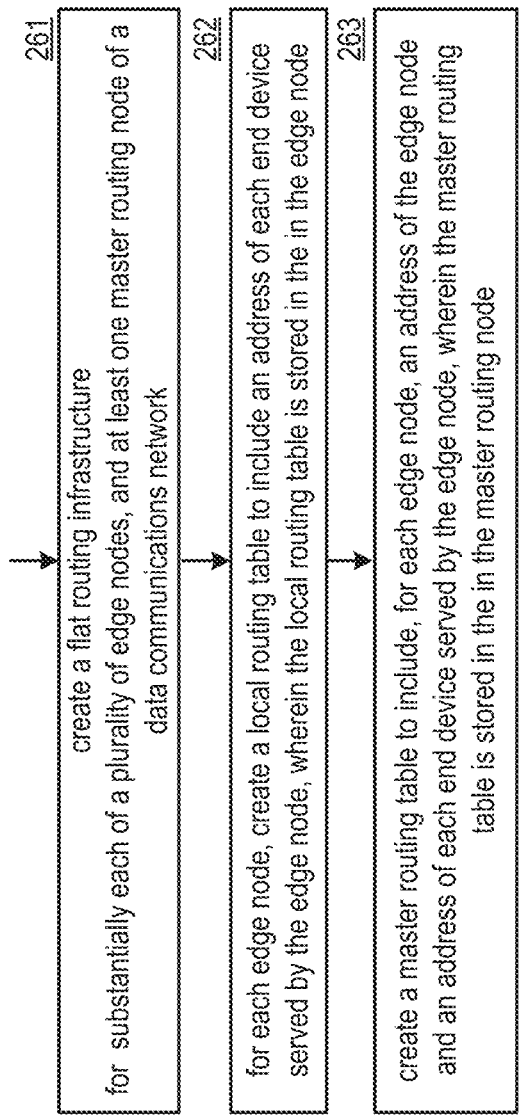
FIGS. 9B and 9C are logic diagrams of an embodiment of a method for providing scalable flat routing of networked devices in accordance with the present invention.

FIG. 9B is a logic diagram of an embodiment of a method for providing an initial configuration of a scalable flat routing infrastructure for networked devices. In particular, a method is presented for use in conjunction with one or more functions and features described in conjunction with FIGS. 1-5, and also FIGS. 9A and 9C. The method includes step 261 where a flat routing infrastructure is created for substantially a plurality of edge nodes, and at least one master routing node. As an example of the creating of a flat routing infrastructure, a deployment may include Local Area Networks (LANs) switches between the plurality of edge nodes and at least one master routing node, with Internet Protocol (IP) addresses assigned solely from a single IP subnet. As another example of the creating of a flat routing infrastructure, a deployment may include Virtual LAN (VLAN) switches between the plurality of edge nodes and at least one master routing node, with Internet Protocol (IP) addresses assigned from one or more IP subnets.

The method continues with step 262 where for each edge node a local routing table is created to include an address of each end device served by the edge node, and where the local routing table is stored in the edge node. The creation of the local routing table includes conformity in part to the local memory table cache described in FIG. 9A. As one specific example of the creating of the local routing table, a network management and analysis tool can identify each of the network connections between end devices and edge nodes at a point in time, which is sufficient for this purpose, and incorporate this data into a tabular format that can be distributed to each edge node. As another example of the creating of the local routing table, each ingress edge node may poll its local connections to end devices and discover the corresponding addresses which can be incorporated into a table. Each edge node can store the table in local memory, hard disk or solid state drive.

The method continues with step 263 where a master routing table 95 is created to include, for each edge node, an address of the edge node, and an address of each end device served by the edge node, where the master routing table 95 is stored in the routing module 116 of master routing node. The creating of the master routing table 95 includes conformity in part to the master routing table 95 described in FIG. 9A. As one specific example of the creating of the master routing table 95, the table data created in step 262 would be aggregated for each edge node network, thereby satisfying the addresses for edge nodes to end devices. A network management and analysis tool could then identify each of the network connections and addresses between edge nodes, and the at least one master routing node, and these data files can be aggregated into tabular form and stored in local memory, hard disk, or solid state drive.

Figure 9C:
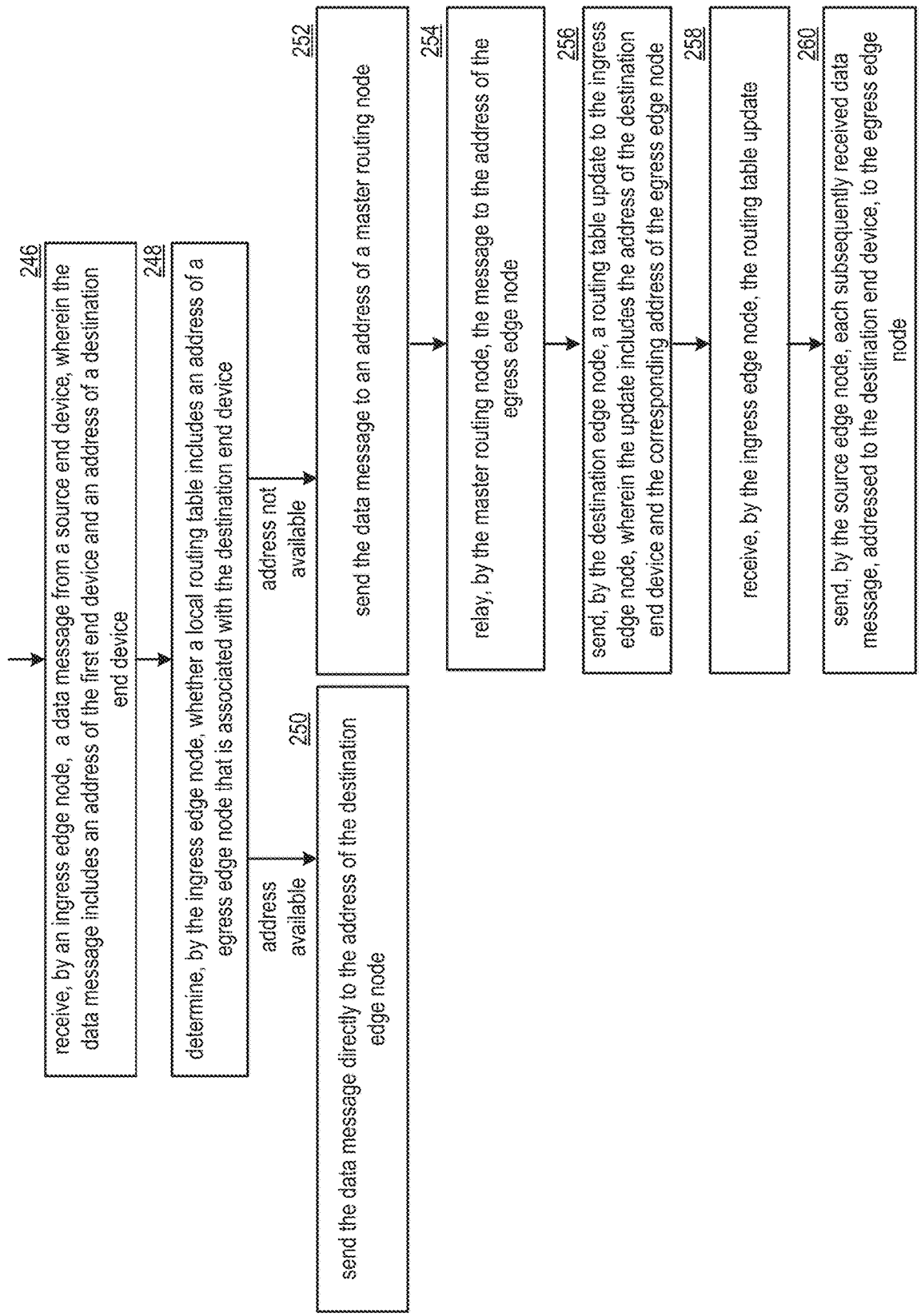

FIG. 9C is a logic diagram of an embodiment of a method for providing a scalable flat routing infrastructure for networked devices with reduced message forwarding latency. In particular, a method is presented for use in conjunction with one or more functions and features described in conjunction with FIGS. 1-5, and also FIGS. 9A and 9B. The method includes step 246 where an ingress edge node, operating within a flat addressing space, receives a data message from a source end device, and where the data message includes an address of the first end device and an address of the destination end device. The receiving of the data message by the egress edge node includes interpreting one or more data packets from the source device that may be utilizing a standard networking protocol (e.g. Internet Protocol, 802.3 Ethernet Protocol). As a specific example of the obtaining, the edge node extracts the source and destination address from the corresponding IP header fields of the source device.

The method continues with step 248 where the ingress edge node determines whether a local routing table includes an address of an egress edge node that is associated with the destination end device. As a specific example of the determining whether a local routing table includes an address of an egress edge node, the ingress edge node may perform a table lookup in its local routing table cache as described in FIGS. 9A and 9C for the specific device destination address.

The method branches to step 250 when the ingress edge node determines that an egress edge node address is available for the device destination address. The method continues to step 252 when the ingress edge node determines that an egress edge node address is not available for the device destination address.

When the edge node address is available, the method continues at step 250 where the ingress edge node sends the data message directly to the address of the egress edge node. The sending of the data message includes applying the egress edge node address to the header of the data message, one approach of which may be implemented as a flat address space compatible network ID or IP-based virtual LAN address. The sending of the data message further includes marking the data message as a directly routed message, one approach of which may be accomplished by appending a specific bit or byte indicator in the body of the message.

When the edge node address is not available, the method continues at step 252 where the ingress edge node sends the data message to an address of a master routing node. The sending of the data message includes applying the egress edge node address to the header of the data message, one approach of which may be implemented as a flat address space compatible network ID or IP-based virtual LAN address. The sending of the data message further includes marking the data message as a relay pending message, one approach of which may be accomplished by appending a bit or byte indicator in the body of the message.

The method continues to step 254 where the master routing node relays the message to the address of the egress edge node. The relaying of the message includes applying the egress edge node address to the header of the data message includes applying the egress edge node address to the header of the data message, one approach of which may be implemented as a flat address space compatible network ID or IP-based virtual LAN address. The sending of the data message further includes marking the data message as a relayed message, one approach of which may be accomplished by appending a bit or byte indicator in the body of the message. The sending of the data message further includes attaching the address of the ingress edge node in the body of the message.

The method continues at step 256 where the egress edge node sends a routing table update to the ingress edge node. The sending includes attaching the address of the destination end device and the corresponding address of the egress edge node. The sending of the data message includes applying the egress edge node address to the header of the data message, one approach of which may be implemented as a flat address space compatible network ID or IP-based virtual LAN address.

The method continues at step 258 where the ingress edge node receives the routing table update. The receiving includes appending the routing information pertaining to the destination device address and the associated egress edge node address into the ingress edge node local routing table cache.

The method continues to step 260 where the source edge node sends each subsequently received data message addressed to the destination end device, to the egress edge node. The sending of the data message includes applying the egress edge node address to the header of the data message, one approach of which may be implemented as a flat address space compatible network ID or IP-based virtual LAN address.

Figure 10A:
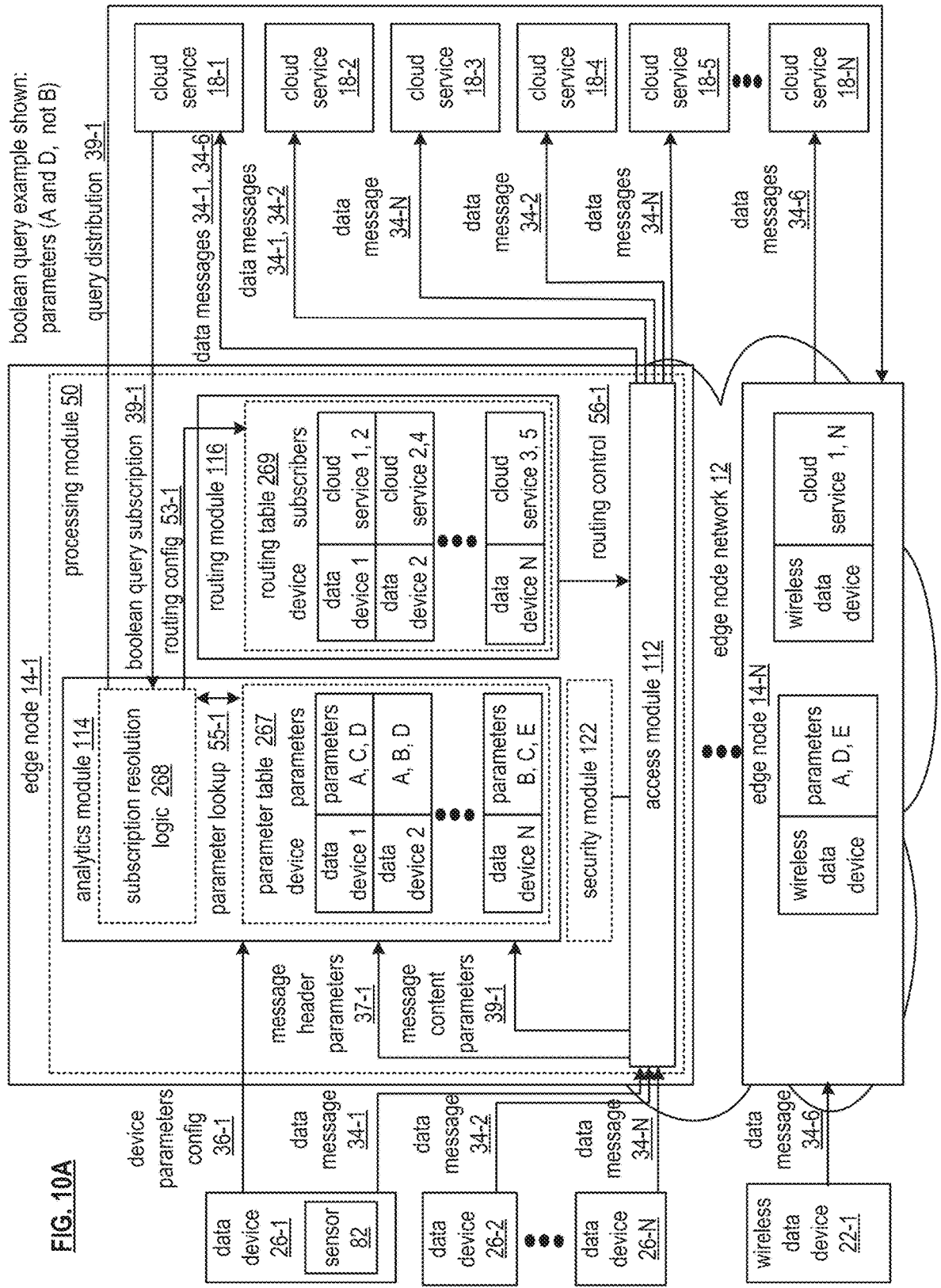
FIG. 10A is a schematic block diagram of another embodiment of a communication system in accordance with the present invention.

FIG. 10A is a schematic block diagram of another embodiment of a secure data communication system that presents solutions to provide criteria-based message routing. The system includes the data devices 26-1 through 26-N of FIG. 1, the wireless data device 22-1 of FIG. 1, the edge node network 12 of FIG. 1, and the cloud services 18-1 through 18-N of FIG. 1.

The data devices 26-1 through 26-N includes one or more of the devices and the modules of the data devices 26-1 through 26-N of FIG. 3. For example, the data device 26-1 includes the sensor 82 of FIG. 3. Wireless data devices 22-1 includes one or more of the modules of the wireless data devices 22-1 through 22-N of FIG. 4.

Edge node network 12 includes the edge nodes 14-1 and 14-N of FIG. 1, where the edge nodes 14-1 and 14-N include one or more of the devices and the modules of the edge nodes 14-1 through 14-N of FIG. 2. For example, the edge nodes 14-1 and 14-N includes the processing module 50 of FIG. 2. The processing module 50 includes the access module 112 of FIG. 5, the analytics module 114 of FIG. 5, and the routing module 116 of FIG. 5. Alternatively, or in additional to, the processing module 50 further includes the security module 122 of FIG. 5 when at least some operational modes required decryption of data messages to extract a message.

An embodiment of the edge node network 12 includes solutions to enable cloud services 18-1 through 18-N to subscribe with Boolean queries (e.g., subscription requests) to various data parameters. The data parameters are associated with the collection of data by sensors of the data devices 26-1 through 26-N and at least one or more of wireless device 22-1 for sending via the edge node network 12 to the cloud services. Examples of data parameters includes sensor type, sensor output data type, physical location, expected update frequency, installation date, owner name, battery type, authorized users, etc.

Edge nodes 14-1 through 14-N possess analytics intelligence enabled by analytics module 114 to process the Boolean queries to filter and route device generated data messages 34-1 through 34-N that match a specific Boolean query and/or subscription to the appropriate cloud service subscriber.

The system can function in at least two modes of operation, the first being based on a static configuration of device parameters, and the second being based on a dynamic assessment of device parameters. The static configuration of device parameters includes receiving specific parameters. The dynamic assessment of device parameters includes interpreting data messages to extract the device parameters.

As an example of a first mode of operation, the data device 26-1 issues a device parameters config 36-1 message to at least edge node 14-1 of the plurality of edge nodes (e.g., serving as an ingress edge node). The data device 26-1 generates the device parameters configuration message 36-1 to include information on various sensor data (as described in FIG. 3), including sensor type, data types, data configuration information, security information, a positive authorization list, a negative authorization list, static location, installation data, and other device-specific data that data device 26-1 is capable of providing to the subscribing cloud services.

The analytics module 114, within processing module 50 of edge node 14-1, receives the device parameters config 36-1 message and stores this device parameter information in parameter table 267, associated to data device 26-1. These parameters are represented as A, B, D for the first data device, referring, for instance, to a wind speed sensor, ground level height, and the static location at a community airport, respectively, among any number of possible data parameter categories.

Edge node 14-1 collects these device parameter configuration messages from other data devices and wireless data devices, thus populating parameter table 267. Similarly, other edge nodes may populate their device parameter tables based on configuration messages from the data devices and wireless data devices for which they serve as the ingress to the edge node network, or alternatively edge node 14-1 operates as the central data parameter collection point. The collecting of device parameter configurations may alternatively include receiving a file detailing the device parameters for a group of data devices or wireless data devices, and may occur off-line, rather than as a transmitted message, and may occur at a system level rather than individually to each edge node.

Separately, at least cloud service 18-1, of the plurality of cloud services, sends a Boolean query subscription 39-1 message to the edge node 14-1 of the plurality of edge nodes in edge node network 12 (e.g., also serving as an egress edge node). The Boolean query subscription 39-1 message identifies the subscribing cloud service and a network address of the cloud service, and contains a request to receive messages from data devices and wireless data devices that conform to certain device parameters as expressed in the Boolean query (e.g., which type of sensor data to receive, etc.). Another edge node of the edge node network 12 may be utilized as an alternate egress edge node to facilitate receiving the query subscription message.

The subscription resolution logic 268 within analytics module 114 of edge node 14-1 receives the Boolean query subscription 39-1 message and broadcasts the query, as a query distribution 39-1 message, to the other edge nodes in the edge node network 12. The subscription resolution logic 268 within analytics module 114 of edge node 14-1 proceeds to resolve the Boolean query contained in the subscription message. Alternatively, the egress edge node contains the parameter table 267 and as such, forwards the query distribution message to an ingress edge node associated with a data device and sensor of interest.

The Boolean queries can be very complex, including those with relative operators, although in this example, cloud service 18-1 submits a very simple Boolean query for device parameters (A and D, not B), which may translate to a subscription request for data from wind speed sensors at the community airport, but not ground level height. To determine which data device(s) have parameter entries that satisfy the Boolean expression, subscription resolution logic 268 performs a parameter lookup 55-1 to parameter table 267. The result of parameter lookup 55-1 is a list of data devices and wireless data devices that provide parameters that match the query made by cloud service 18-1.

In this example, the first data device, corresponding to data device 26-1, matched the query. Similarly, within edge node 14-N, which received the query distribution 39-1 message from edge node 14-1, a query match was found with the data parameter of wireless data device 22-1. Having received a query match, subscription resolution logic 268, of edge node 14-1, sends routing config 53-1 message to routing module 116. The routing config 53-1 message associates data devices and wireless data devices with cloud services, which in this example, associates data device 26-1 with cloud service 18-1.

The information in routing config 53-1 message enables routing module 116 to populate routing table 269, which maintains an overall list of associations between data devices and cloud services for purposes of data message routing. Upon receiving any routing config 53-1 messages, routing module 116 sends a routing control 56-1 message to access module 112 to inform the access module to which cloud services ingress data messages from data devices and wireless data devices should be routed.

When data messages 34-1 through 34-N, sourced by data devices and wireless data devices, are subsequently received by access module 112, the access module in conjunction with routing module 116, routes these data messages to the appropriate cloud services 18-1 through 18-N that have requested to receive them through their Boolean query subscription. Data messages 34-1 through 34-N can be sent to multiple destinations when more than one cloud service has subscribed to the device that sourced the message, and in these cases access module 112 in conjunction with routing module 116 perform the required replication.

In this example, data message 34-1, when received, is routed to cloud service 18-1 based on the Boolean query subscription from cloud service 18-1. Based on the contents of parameter table 267 and routing table 269, data message 34-1 shall be replicated and routed to cloud service 18-2. Likewise, data message 34-2 will be replicated and routed to both cloud services 18-2 and 18-4, while data message 34-N will be routed only to cloud service 18-3. Data message 34-6, which was received by edge node 14-N, will be sent to cloud service 18-1, based on the Boolean query subscription, made by cloud service 18-1, which was satisfied by the data parameters of wireless data device 22-1.

The second mode of operation provides additional supplementation to the first mode of operation through the collection of additional device parameters that can only be obtained dynamically through the inspection and analysis of the data messages received from the data devices and wireless data devices. The collection of these additional device parameters expands a range of content that can be offered to cloud services.

As an example of the supplementation that the second mode of operation provides, the edge node 14-1, of the plurality of edge nodes 14-1 through 14-N, tracks and inspects data messages 34-1 through 34-N as they are received by access module 112. The tracking of the data messages may include monitoring and measuring their frequency of arrival (e.g., establishing a pattern), and may be performed on a device by device basis. The inspecting of the data messages may include extracting parameters from the message headers (e.g., IP addresses, port numbers, length, type of service, data type of a data payload portion of the data message).

Upon extracting the message header parameters, access module 112 passes these parameters in the message header parameters 37-1 message to the analytics module 114, which subsequently populates parameter table 267 with these additional parameters for the corresponding data device or wireless device that sourced the data message 34-1 through 34-N. The inspecting of the data messages may also include extracting content from the message body (e.g., application layer information including the sensor data itself), which if the data is encrypted would additionally require the access module 112 to utilize the security module 122 to perform the required decryption operations. Upon extracting the message content parameters, access module 112 passes these parameters in the message header parameters 37-1 message to the analytics module 114, which subsequently populates parameter table 267 with these additional parameters corresponding to the data device or wireless device that sourced the data message 34-1 through 34-N.

These additional collected data parameters, enable a wider range of Boolean queries that can be made by cloud services 18-1 through 18-N, without impacting the other aspects of the system operation previously described. The criteria-based routing system provides a performance enhancement by placing the intelligence for subscription-based data services at the lowest level routing/filtering layer where rapid forwarding and replication can occur, and having the query assessments directly impact the routing tables.

FIGS. 10B-10G are data flow diagrams of an embodiment of machine data routing within a secure data communication system that includes Internet of things (IoT) sensors 270 (e.g., data devices equipped with sensors), the edge node network 12 of FIG. 10A, and subscribing entities 276 (e.g., cloud services). The edge node network 12 includes edge nodes 1-12, where edge nodes provide one or more of routing functions, ingress switch functions (e.g., ingress edge nodes), and egress switch functions (e.g., egress edge nodes).

Hereafter, the edge nodes may be interchangeably referred to as edge computing entities, where an edge computing entity includes a cluster of one or more computing devices. Each computing device includes one or more computing cores and each computing core includes one or more processing modules along with memory and input/output support devices and/or modules as illustrated in FIG. 2.

Figure 10B:
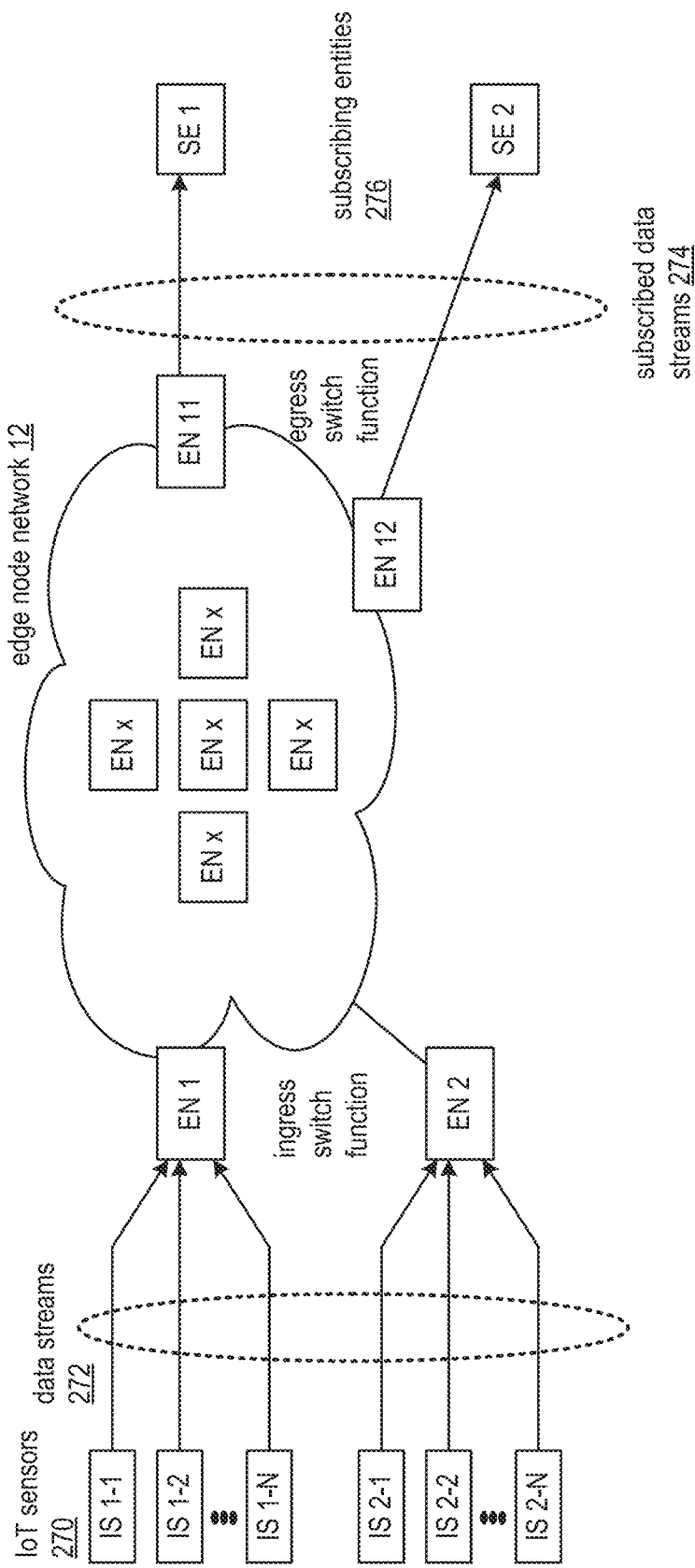
FIGS. 10B-10G are data flow diagrams of an embodiment of machine data routing within a communication system in accordance with the present invention.

FIG. 10B is a high-level data flow diagram of an embodiment of the secure data communication system where the Internet of things (IoT) sensors 270 send data streams 272 to edge nodes providing an ingress switch function of edge nodes of the edge node network 12. The edge node network 12 routes at least some of the data streams to other edge nodes serving as egress switch functions to output subscribed data streams 274 to subscribing entities 276.

The ingress switch function identifies data parameters of the data streams 272, temporarily stores the data streams 272 in a local memory, determines whether to forward at least some of the data streams 272 through the edge nodes of the edge node network 12 to other edge node serving as the egress switch function. The determining whether to forward includes identifying a match between data parameters of a portion of the data stream to a request (e.g., a subscription request, a default) from one of the subscribing entities 276. For instance, the determining includes identifying auto safety related data parameters from the IoT sensors as a match to a car manufacturer subscribing entity.

When forwarding, the ingress switch function facilitates routing of the portion of the data streams through the edge nodes of the edge node network 12 to a corresponding edge node serving as the egress switch function for the particular subscribing entity. The egress switch function edge node forwards the portion of the data streams to the subscribing entity. For instance, the egress switch function edge node forwards the auto safety related data streams (e.g., data messages from a speed sensor, an acceleration sensor, a braking sensor, an airbag sensor, etc.). A detailed example of operation is discussed with reference to FIGS. 10C-G.

Figure 10C:
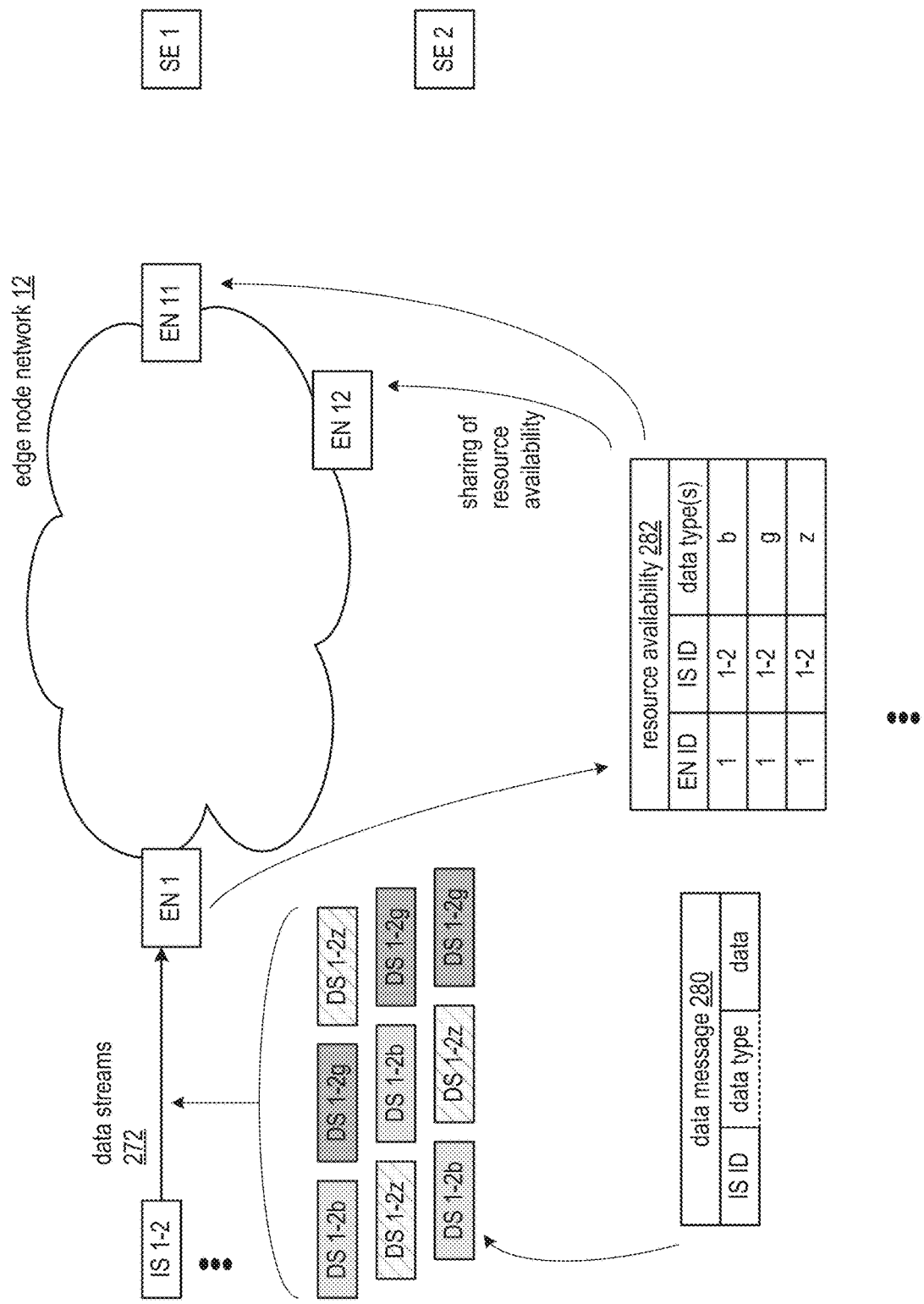

FIG. 10C illustrates steps of the example of operation where edge node 1 (EN 1), serving as the ingress switch function, receives data streams 272 from the IoT sensor 1-2 (IS 1-2). For example, the data streams 272 includes data messages from three sensors producing data stream DS 1-2*b* (e.g., speed), DS 1-2*g* (e.g., braking), and DS 1-2*z* (e.g., air bags).

Each data stream includes a series of data messages, where a data message 280 includes an IoT identifier (IS ID), data (e.g., sensor data), and a data type. The data messages may occur at consistent time frames (e.g., every 30 seconds), inconsistently with regards to timing (e.g., several bursts followed by long periods of inactivity), and only by request.

The data type is represented by an explicit field including the data type identifier or by nature of inspection of the data itself or even by observing a pattern of generation of the data messages of the data stream. For instance, the data type for temperature is interpreted when a data message is received every minute and it is known that temperature sensors send temperature data once per minute.

The ingress edge node EN 1 catalogs the data streams 272 from one or more IoT sensors to produce resource availability 282. The resource availability 282 correlates identifiers of the ingress edge node with identifiers of the IoT sensors it serves and with the data types (e.g., multiple data parameters) that are associated with the IoT sensors. For example, the resource availability 282 identifies IS 1-2 providing datatypes b (e.g., speed), g (e.g., braking), and z (e.g., airbags).

The ingress edge node EN 1 shares the resource availability 282 with other edge nodes of the edge node network 12 that serve as egress switch nodes. This facilitates subsequent establishing of subscriptions between subscribing entities, their supporting egress edge nodes, and the particular ingress node that is attached to an IOT sensor streaming a desired data stream.

Figure 10D:
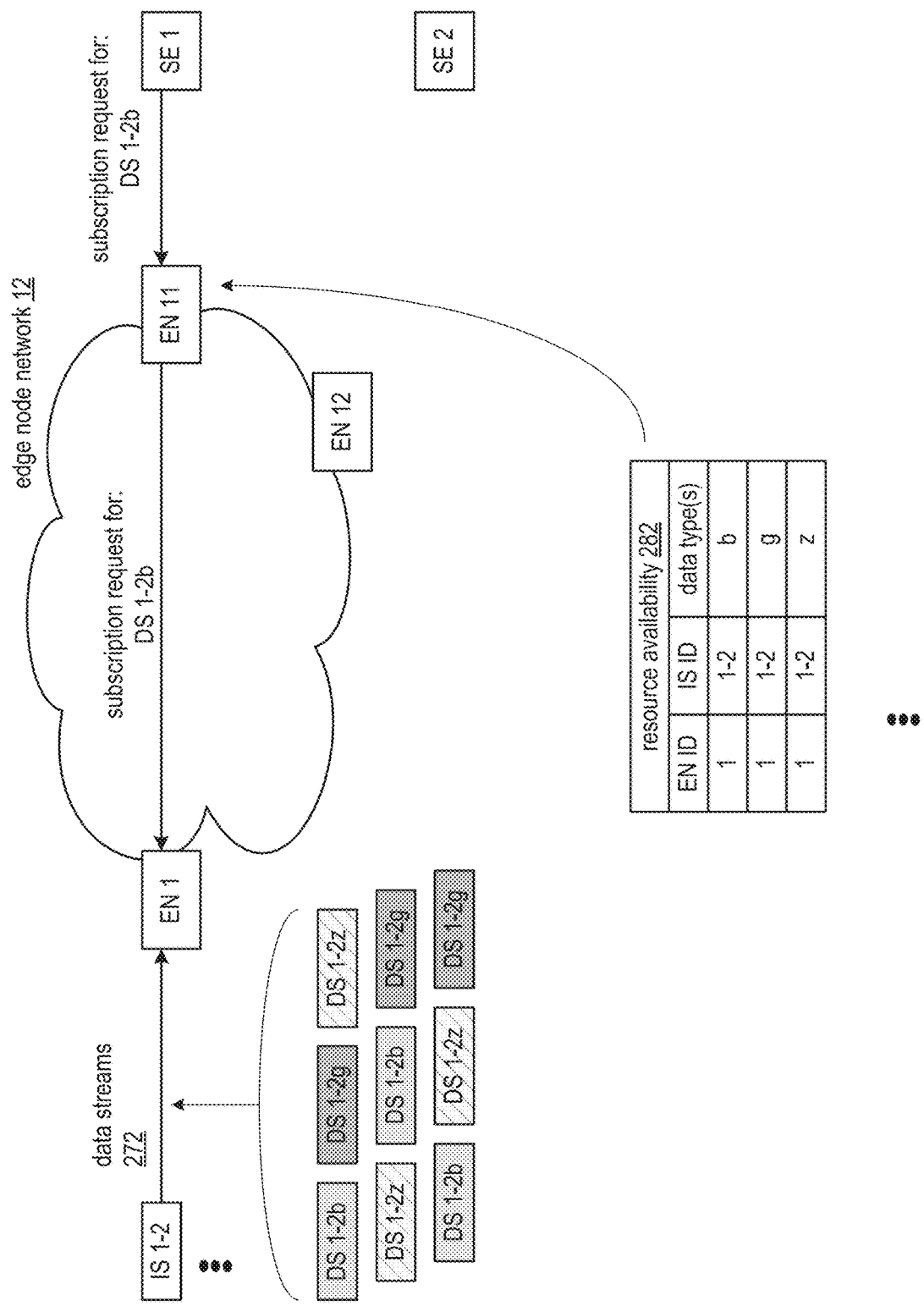

FIG. 10D illustrates further steps of the example of operation where edge node EN 11, serving as the egress switch function, receives a subscription request for DS 1-2*b* from subscribing entity SE 1. For example, a cloud service associated with an auto manufacturer desires to receive speed information from an automobile equipped with a speed sensor. The cloud service SE 1 issues the subscription request to any edge node serving as an egress switch node of the edge node network 12. The issuing of the subscription request includes authentication and security steps to establish trust between SE 1 and the EN 11. For instance, the SE 1 generates the request to include security credentials that are verified by EN 11.

When the trust has been established, the EN 11 compares the subscription request to the resource availability 282 to determine that the speed data (e.g., data type b) is available from the IS 1-2 attached to EN 1. The EN 11 forwards, via edge nodes of the edge node network 12, the validated and authenticated subscription request to the EN 1 serving as the ingress edge node for further processing.

Figure 10E:
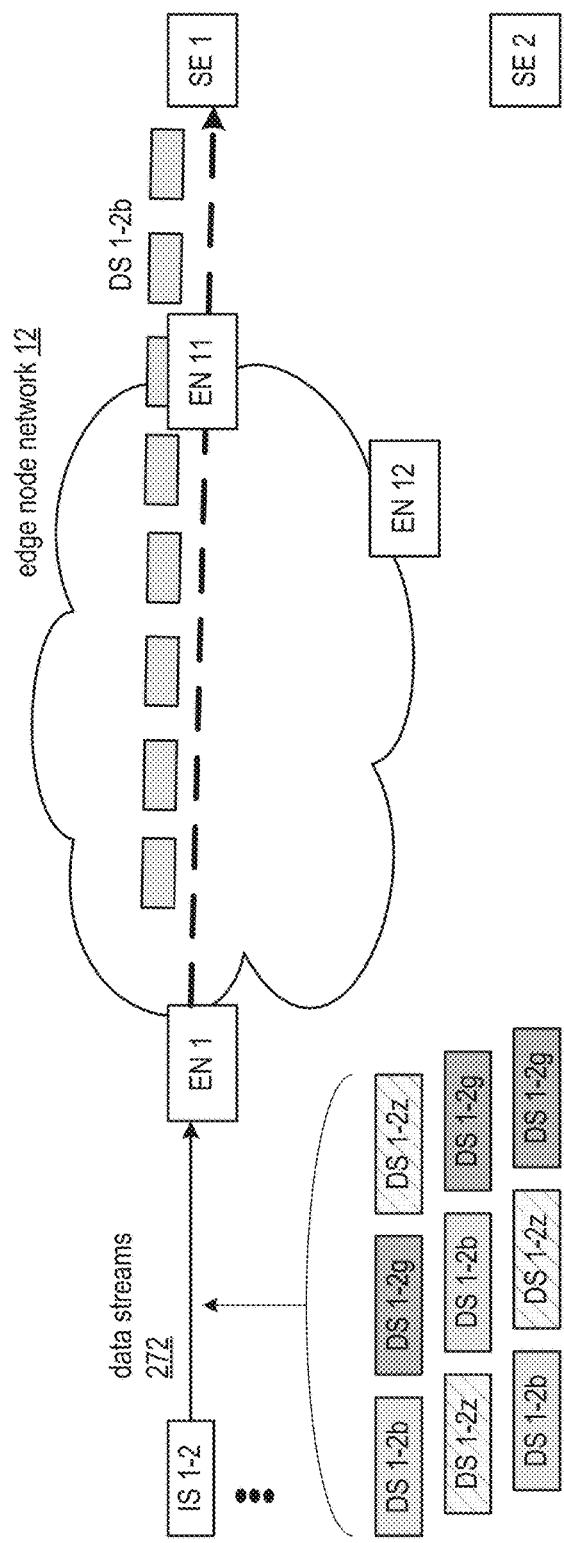

FIG. 10E illustrates further steps of the example of operation where edge node EN 1, serving as the ingress switch function, having received the validated and authenticated subscription request for DS 1-2*b* from the EN 11 on behalf of the subscribing entity SE 1, outputs and replicate of the temporarily stored portion of the data stream 272 associated with the data type b (e.g., speed) to the EN 11 for forwarding to the SE 1. The data messages associated with the other data streams is held for a short time frame within the local memory of EN 1 to facilitate forwarding based on other subscriptions. Data messages that are not associated with a subscription are deleted or written over after the short time frame.

Figure 10F:
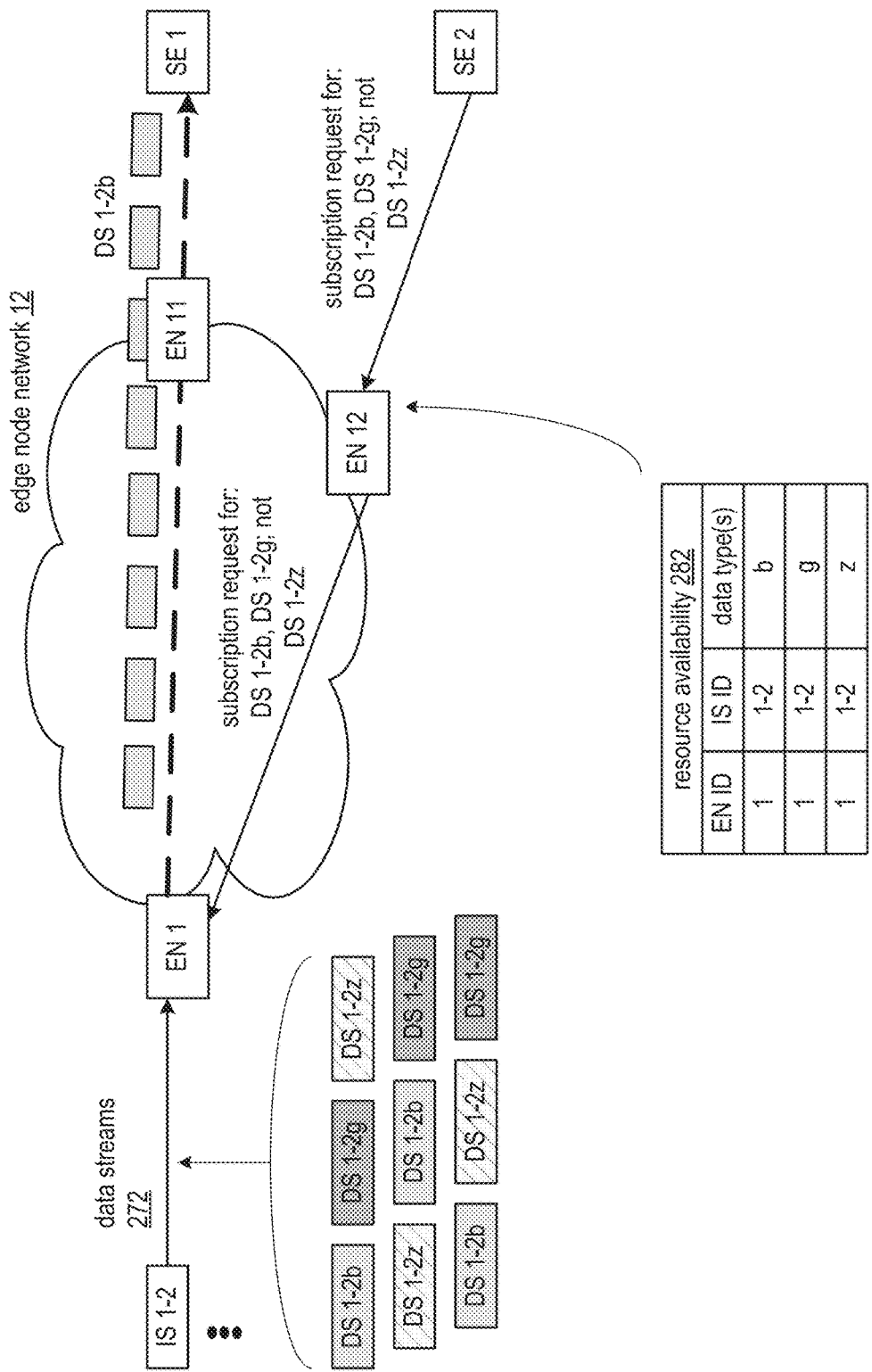
Figure 10G:
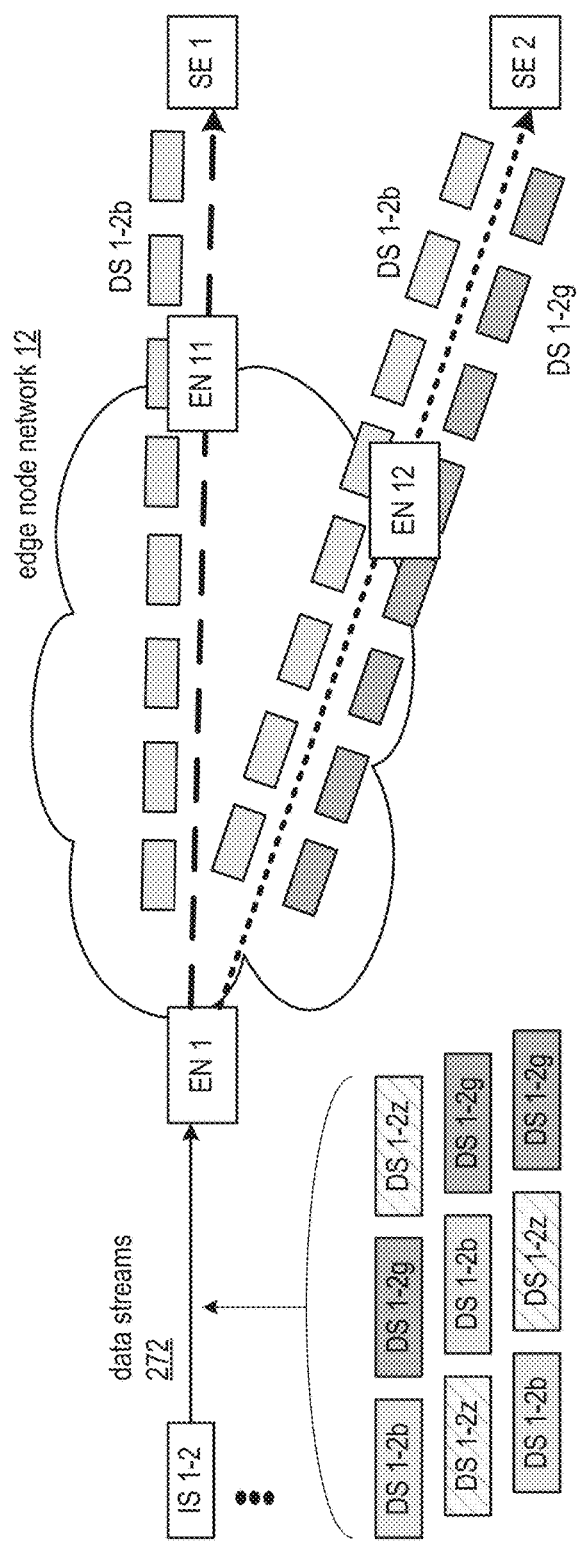

FIG. 10F illustrates further steps of the example of operation where edge node EN 12, serving as another egress switch function, receives a subscription request for DS 1-2*b*, DS 1-2*g*, and not DS 1-2*z* from subscribing entity SE 2. For example, a cloud service associated with an auto industry safety organization desires to receive the speed information, braking information, but not the airbag information from the automobile equipped with multiple sensors. The cloud service SE 2 issues the subscription request to any edge node serving as an egress switch node of the edge node network 12. The issuing of the subscription request includes the authentication and security steps to establish trust between SE 2 and the EN 12. For instance, the SE 2 generates the request to include further unique security credentials that are verified by EN 12.

When the trust has been established, the EN 12 compares the subscription request to the resource availability 282 to determine that the speed data (e.g., data type b) is available from the IS 1-2 attached to EN 1, and that the braking data (e.g., data type g) is also available from IS 1-2 attached to EN 1. The EN 12 forwards, via edge nodes of the edge node network 12, the validated and authenticated subscription request to the EN 1 serving as the ingress edge node for further processing. Alternatively, or in addition to, the EN 12 forwards at least a portion of the validated and a dedicated subscription request to another edge node serving as an ingress edge node for other sensor data that is streaming from another IoT sensor attached to the other edge node.

FIG. 10F illustrates further steps of the example of operation where edge node EN 1, serving as the ingress switch function, having received the validated and authenticated subscription request for DS 1-2*b* and DS 1-2*g* from the EN 12 on behalf of the subscribing entity SE 2, outputs replicates of the temporarily stored portion of the data streams 272 associated with the data type b (e.g., speed) and data type g (e.g., braking) to the EN 12 for forwarding to the SE 2. The data messages (e.g., airbags) associated with the other data streams is held for a short time frame within the local memory of EN 1 to facilitate forwarding based on other subscriptions and are deleted or written over after the short time frame.

Figure 10H:
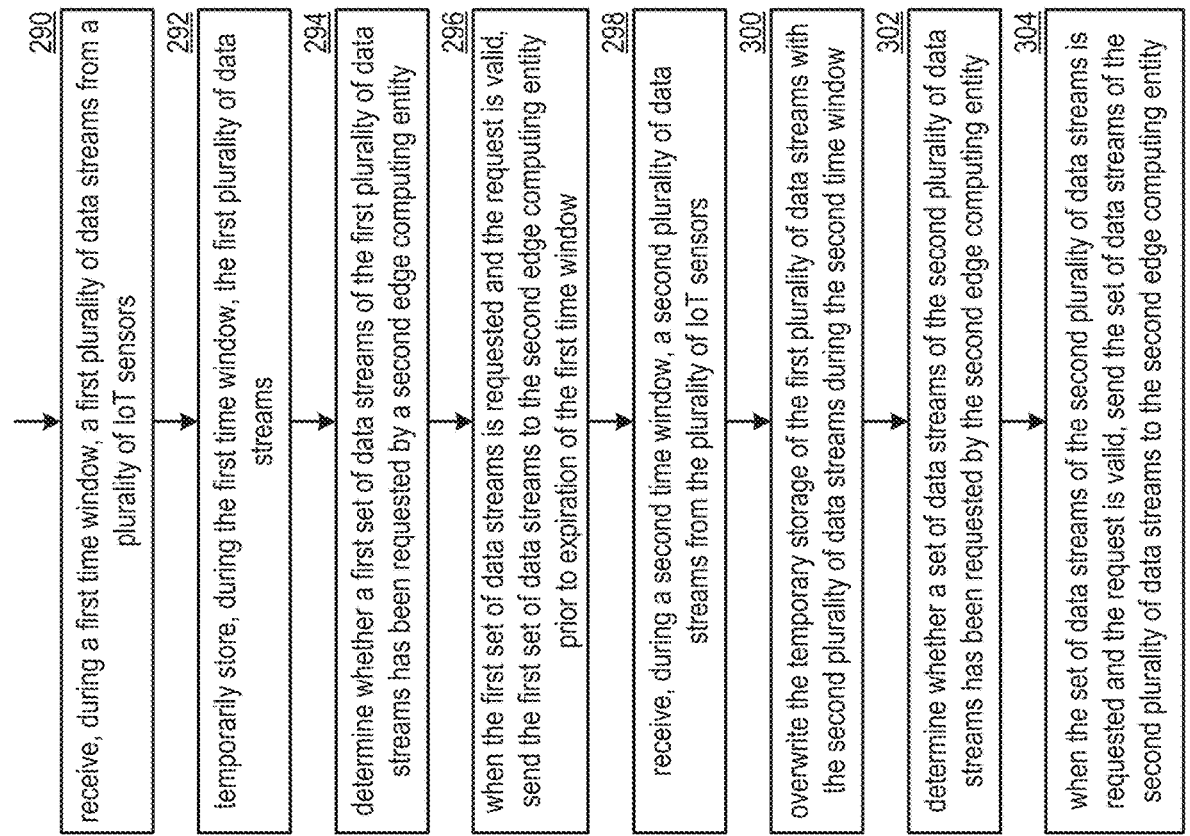
FIG. 10H is a logic diagram of an embodiment of a method of machine data routing within a communication system in accordance with the present invention.

FIG. 10H is a logic diagram of an embodiment of a method of machine data routing within a communication system (e.g., a secure data communication system). In particular, a method is presented for use in conjunction with one or more functions and features described in conjunction with FIGS. 1-5, and also FIGS. 10A-G. The method includes step 290 where a processing module of an edge computing entity of the secure data communication system receives, during a first time window, a first plurality of data streams from a plurality of IoT sensors. The data streams include one or more of push data, continuous data, periodic data, random data, data bursts, etc.

The method continues at step 292 for the processing module temporarily stores, during the first time window, the first plurality of data streams. The first time window establishes a timeframe in which the data streams are temporarily held for potential forwarding to subscribing entities. The data streams are deleted or overwritten at the end of the first time window.

The method continues at step 294 where the processing module determines whether a first set of data streams of the first plurality of data streams has been requested by a second edge computing entity of the secure data communication system. A set of data streams includes one or more data streams, where each data stream includes one or more data messages associated with various data parameters of a data type.

The determining whether the first set of data streams of the first plurality of data streams has been requested by the second edge computing entity includes a variety of approaches. A first approach includes indicating that at least one data stream of the first set of data streams has been requested by the second edge computing entity when a subscription request generated by the second edge computing entity associates the at least one data stream of the first set of data streams to the second edge computing entity. For example, the second edge computing entity, on behalf of a subscribing entity, issues a subscription request to the processing module of the edge computing entity by one or more of an IoT sensor identifier, a data stream identifier, a type of data of the at least one data stream, and any other data parameter associated with one or more data streams.

A second approach to determine whether the first set of data streams has been requested includes indicating that the at least one data stream of the first set of data streams has been requested by the second edge computing entity when a subscription mapping associates the at least one data stream of the first set of data streams to the second edge computing entity. For example, the processing module obtains subscription mapping established by at least one of the second edge computing entity, by the edge computing entity, by default, by a predetermination, and determined based on a data type affiliation to the second edge computing entity.

A third approach to determine whether the first set of data streams has been requested includes indicating that the at least one data stream of the first set of data streams has been requested by the second edge computing entity when a data pattern of the at least one data stream compares favorably to a reference data pattern of a desired data stream for the second edge computing entity. For example, the processing module interprets the data pattern (i.e., repetition of data elements of the data stream) of the at least one data stream and compares the interpretation to the reference data pattern. The processing module indicates that the at least one data stream has been requested when the comparison is favorable, i.e., substantially the same.

A fourth approach to determine whether the first set of data streams has been requested includes indicating that the at least one data stream of the first set of data streams has been requested by the second edge computing entity when a data type of the at least one data stream compares favorably to a desired data type for the second edge computing entity. For example, the processing module extracts the data type from a data type indicator of the data stream or interprets the data type from data of the data stream, compares the data type to the desired data type, and indicate that the at least one data stream has been requested when the comparison is favorable, i.e., substantially the same.

When the first set of data streams is requested and the request is valid (i.e., each data stream of the first set of data streams is available, the second computing entity is properly authorized to receive the first set of data streams), the method continues at step 296 where the processing module sends the first set of data streams to the second edge computing entity prior to expiration of the first time window. For example, the processing module sends to data streams of subscribed data to the second edge computing entity for forwarding to a subscribing entity.

Alternatively, or in addition to, the processing module determines whether a second set of data streams of the first plurality of data streams has been requested by the second edge computing entity of the secure data communication system. For example, another subscribing entity attached to the second edge computing entity desires they different set of data streams. When the second set of data streams of the first plurality of data streams is requested and the request is valid, the processing module sends the second set of data streams of the first plurality of data streams to the second edge computing entity prior to expiration of the first time window.

Further alternatively, or in addition to, the processing module determines whether a second set of data streams of the first plurality of data streams has been requested by a third edge computing entity of the secure data communication system. For example, another edge node of the secure data communication system requests data streams of the half of yet another subscribing entity. When the second set of data streams of the first plurality of data streams is requested and the request is valid, the processing module sends the second set of data streams of the first plurality of data streams to the third edge computing entity prior to expiration of the first time window.

The method continues at step 298 where the processing module receives, during a second time window, a second plurality of data streams (i.e., different data streams, similar data streams, later data streams) from the plurality of IoT sensors. The second time window is subsequent in time to the first time window. For example, the first time window expires and the second time window begins, where further data streams are to be temporarily stored for potential forwarding to subscribing entities.

The method continues at step 300 where the processing module overwrites the temporary storage of the first plurality of data streams with the second plurality of data streams during the second time window. For example, the first plurality of data streams is no longer required when transitioning to the second time window such that the memory utilized for the temporary storage of the first plurality of data streams is to be reclaimed by overwriting with the second plurality of data streams.

The method continues at step 302 where the processing module determines whether a set of data streams of the second plurality of data streams has been requested by the second edge computing entity of the secure data communication system. For example, the processing module receives a subscription request for at least some of the data streams of the second plurality of data streams from the second edge computing entity on behalf of another subscribing entity.

When the set of data streams of the second plurality of data streams is requested and the request is valid, the method continues at step 304 where the processing module sends the set of data streams of the second plurality of data streams to the second edge computing entity prior to expiration of the second time window. For example, the processing module forwards a replicate of the set of data streams of the second plurality of data streams to the second edge computing entity for forwarding to the other subscribing entity.

In an embodiment, the set of data streams of the second plurality of data streams and the first set of data streams of the first plurality of data streams are from a same IoT device. For example, the IoT device continues to send data streams from the first time window to the second time window.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices of one or more computing entities (e.g., one or more servers, one or more routers, one or more user devices) of the computing system 10, cause the one or more computing devices to perform any or all of the method steps described above.

Figure 11A:
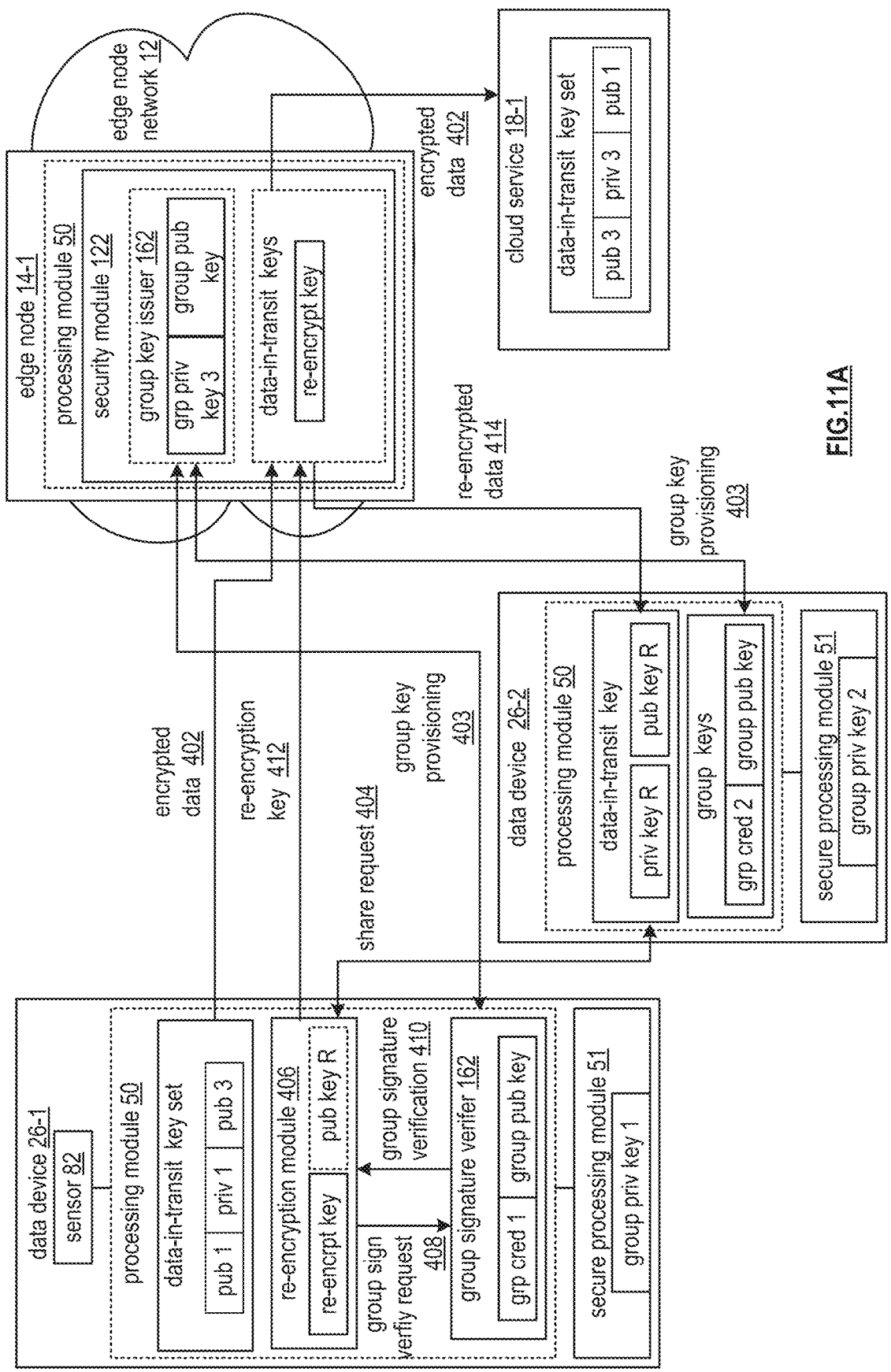
FIG. 11A is a schematic block diagram of another embodiment of a communication system in accordance with the present invention.

FIG. 11A is a schematic block diagram of another embodiment of a re-encryption that improves the management of communication system that implements a group signature based authentication for proxy re-encryption. The system includes data devices 26-1 and 26-2 of FIG. 1, edge node network 12 of FIG. 1, and cloud service 18-1 of FIG. 1.

The data device 26 may include one or more of the devices and the modules of the data devices 26-1 through 26-N of FIG. 3. For example, the data devices 26-1 and 26-2 include the processing module 50 of FIG. 3, and a secure processing module 51 of FIG. 3. Data Device 26-1 also includes sensor 82 of FIG. 3, and introduces a re-encryption module 406 which is responsible for processing re-encryption requests, and group signature verifier 162 which provides verification service for group signed re-encryption requests.

The edge node network 12 includes edge node 14-1 of FIG. 1. Edge node 14-1 may include one or more of the edge nodes and the modules of the edge nodes 14-1 through 14-N of FIG. 2. For example, the edge node 14-1 includes the processing module 50 of FIG. 2, where the processing module 50 of the edge node 14-1 includes the security module 122 of FIG. 5.

Re-encryption schemes generally operate to enable an entity sourcing data to selectively share that data confidentially with trusted consuming entities without allowing the network that is passing the traffic an opportunity to break the data confidentiality. Initially, processing module 50 in conjunction with secure processing module 51 on data devices 26-1 and data device 26-2, implement the group key provisioning 403 handshake to each acquire a set of group signing keys from edge node 14-1, which is operating as a group key issuer (e.g., a DAA issuer). Edge node 14-1 securely generates the group keys (e.g. DAA keys) for data device 26-1 and device 26-2, using processing module 50, security module 122, and group key issuer 162, and following a provisioning and registration/join procedure outlined for FIG. 7A (without the need to transition the secure processing modules from a virtual provisioning device).

Equipped with a valid group credential, group private and public keys, the two data devices have established a secure trust relationship that can be authenticated on demand.

Separately, data device 26-1 is sending data from sensor 82 as encrypted data 402 through edge node network 12 to the trusted consumer, cloud service 18-1, using one of the various standard data-in-transit encryption protocols. The data remains encrypted as it passes through edge node 14-1, satisfying a requirement to never expose the data to the network provider.

When data device 26-2 wants to become another consumer of the 26-1 data steam, the device makes a share request 404 to data device 26-1. The share request 404 message also contains a data in transit public key (associated to a private key owned by data device 26-2) that can be used by data device 26-1 to create a re-encryption key. Having pre-established trust via a common attestation group, data device 26-2 is able to sign the share request 404 using the group private key and group credential that was acquired during the provisioning process.

This group signed request is received by data device 26-1, and acted upon by re-encryption module 406, within processing module 50. Re-encryption module 406 sends a group signed verify request 4082 group signature verifier 162, which utilizes the group public-key to verify the signature is coming from a valid group member. Group signature verifier 162 responds with group signature verification 410 to re-encryption module 406. Assured of the authenticity of data device 26-2, re-encryption module 406 utilizes the public key provided by data device 26-2, combined with the asymmetric key used for encrypting the sensor data that continues to be in transit through edge node network 12 to cloud service 18-1, to generate a re-encryption key. Methods to generate the re-encryption key are well-known.

Having generated the re-encryption key, re-encryption module 406 sends the key to edge node 14-1 in re-encryption key 412, which is acted upon by security module 122. The re-encryption key enables edge node 14-1 to re-encrypt the encrypted data 402 flow, without ever decrypting, while preserving the encryption being utilized between data device 26-1 and cloud service 18-1. The re-encryption process retains the confidentiality of the data from edge node 14-1 and the edge node network 12 in general, as well as prevents the requester from requiring the private key of the sourcing entity. Security module 122 of edge node 14-1 can now send re-encrypted data 414 to the requester, data device 26-2. Because the re-encryption keying algorithm utilized a public key associated to a private key owned by data device 26-2, data device can decrypt the re-encrypted data 414 content, completing the process of securely sharing the sensor data from data device 26-1.

Figure 11B:
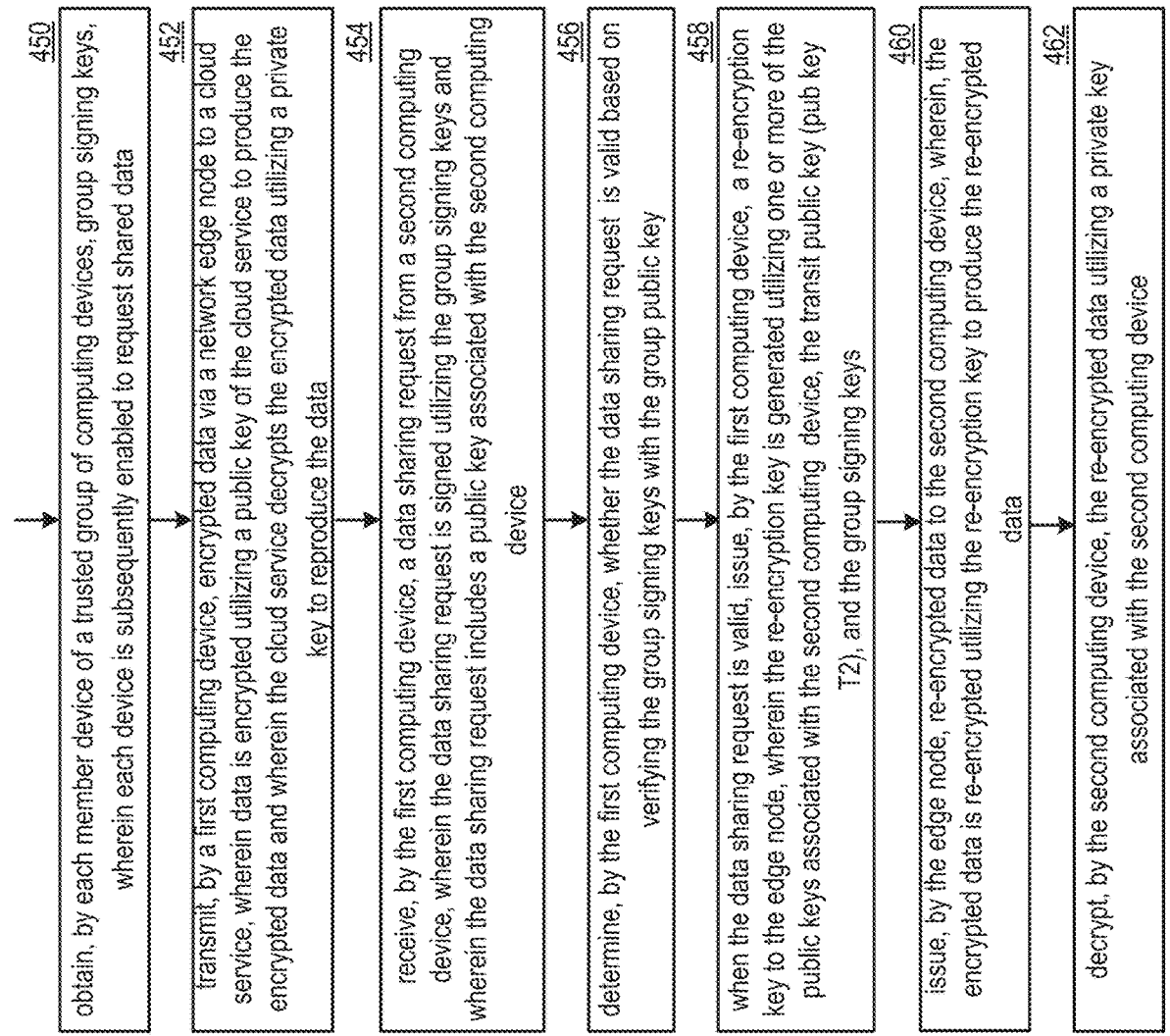
FIG. 11B is a logic diagram of an embodiment of a method for providing group signature based proxy re-encryption in accordance with the present invention.

FIG. 11B is a logic diagram of an embodiment of a communication system that improves the secure sharing of data through group signature based authentication. The method includes step 450 where each member device of a trusted group of computing devices obtains group signing keys, where each device is subsequently enabled to request shared data. The obtaining of group signing keys includes member devices performing a provisioning and registration/join procedure with a group key manager/issuer function (e.g., a DAA issuer). The obtaining may further include employing secure processing modules (e.g., a TPM chip) that can securely perform the provisioning and storage of the group signing keys, and result in a valid group credential group member private key. As an example, an edge node operating as a DAA issuer can both generate and distribute group signing keys securely with TPM based devices.

The method continues at step 452 where a first computing device transmits data via a network edge node to a cloud service, where data is encrypted utilizing a public key of the cloud service to produce the encrypted data, and where the cloud service decrypts the encrypted data utilizing a private key to reproduce the data. The transmitting data by the first computing device includes at minimum obtaining the cloud service public key for encrypting one way transmissions from the computing device to the cloud service, and providing the cloud service with the public key of the first computing device to enable two-way communications.

The method continues at step 454 where the first computing device receives a data sharing request from a second computing device where the data sharing request is signed utilizing the group signing keys, and where the data sharing request includes a public key associated with the second computing device. The receiving a data sharing request may include the second computing device utilizing a secure processing module to form the group signature in conjunction with the credential stored by the processing module of the computing device.

The method continues at step 456 where the first computing device determines whether the data sharing request is valid based on verifying the group signing keys with the group public key. The determination of validity involves operating as the verifier functionality of a verify/sign protocol for anonymous attestation.

The method continues at step 458 when the data sharing request is valid, where the first computing device issues a re-encryption key to the edge node, utilizing one or more of the public keys associated with the second computing device, the transit public key, and the group signing keys. The method continues at step 460 where the edge node issues re-encrypted data to the second computing device, where the encrypted data is re-encrypted utilizing the re-encryption key to produce the re-encrypted data. The method continues at step 462 where the second computing device decrypts the re-encrypted data utilizing a private key associated with the second computing device.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an edge computing entity of a secure data communication system, the method comprises:
   receiving, during a first time window, a first plurality of data streams from a plurality of Internet of Things (IoT) sensors;
   temporarily storing, during the first time window, the first plurality of data streams;
   determining whether a first set of data streams of the first plurality of data streams has been requested by a second edge computing entity of the secure data communication system;
   when the first set of data streams is requested and the request is valid, sending the first set of data streams to the second edge computing entity prior to expiration of the first time window;
   receiving, during a second time window, a second plurality of data streams from the plurality of IoT sensors, wherein the second time window is subsequent in time to the first time window; and
   overwriting the temporary storage of the first plurality of data streams with the second plurality of data streams during the second time window.

2. The method of claim 1 further comprises:
   determining whether a set of data streams of the second plurality of data streams has been requested by the second edge computing entity of the secure data communication system; and
   when the set of data streams of the second plurality of data streams is requested and the request for the set of data streams of the second plurality of data streams is valid, sending the set of data streams of the second plurality of data streams to the second edge computing entity prior to expiration of the second time window.

3. The method of claim 2 further comprises:
the set of data streams of the second plurality of data streams and the first set of data streams of the first plurality of data streams are from same IoT device.

4. The method of claim 1 further comprises:
determining whether a second set of data streams of the first plurality of data streams has been requested by the second edge computing entity of the secure data communication system; and
when the second set of data streams of the first plurality of data streams is requested and the request for the second set of data streams of the first plurality of data streams is valid, sending the second set of data streams of the first plurality of data streams to the second edge computing entity prior to expiration of the first time window.

5. The method of claim 1 further comprises:
determining whether a second set of data streams of the first plurality of data streams has been requested by a third edge computing entity of the secure data communication system; and
when the second set of data streams of the first plurality of data streams is requested and the request for the second set of data streams of the first plurality of data streams is valid, sending the second set of data streams of the first plurality of data streams to the third edge computing entity prior to expiration of the first time window.

6. The method of claim 1, wherein the determining whether the first set of data streams of the first plurality of data streams has been requested by the second edge computing entity comprises one or more of:
indicating that at least one data stream of the first set of data streams has been requested by the second edge computing entity when a subscription request generated by the second edge computing entity associates the at least one data stream of the first set of data streams to the second edge computing entity;
indicating that the at least one data stream of the first set of data streams has been requested by the second edge computing entity when a subscription mapping associates the at least one data stream of the first set of data streams to the second edge computing entity;
indicating that the at least one data stream of the first set of data streams has been requested by the second edge computing entity when a data pattern of the at least one data stream matches a reference data pattern of a desired data stream for the second edge computing entity; and
indicating that the at least one data stream of the first set of data streams has been requested by the second edge computing entity when a data type of the at least one data stream matches a desired data type for the second edge computing entity.

7. An edge computing entity of a secure data communication system, the edge computing entity comprises: an interface; a local memory; and a processor acting as a processing module operably coupled to the interface and the local memory, wherein the processing module functions to:
receive, via the interface during a first time window, a first plurality of data streams from a plurality of Internet of Things (IoT) sensors; temporarily store, in the local memory during the first time window, the first plurality of data streams; determine whether a first set of data streams of the first plurality of data streams has been requested by a second edge computing entity of the secure data communication system; when the first set of data streams is requested and the request is valid, send, via the interface, the first set of data streams to the second edge computing entity prior to expiration of the first time window; receive, via the interface during a second time window, a second plurality of data streams from the plurality of IoT sensors, wherein the second time window is subsequent in time to the first time window; and overwrite, in the local memory, the temporary storage of the first plurality of data streams with the second plurality of data streams during the second time window.

8. The edge computing entity of claim 7, wherein the processing module further functions to:
determine whether a set of data streams of the second plurality of data streams has been requested by the second edge computing entity of the secure data communication system; and
when the set of data streams of the second plurality of data streams is requested and the request for the set of data streams of the second plurality of data streams is valid, send, via the interface, the set of data streams of the second plurality of data streams to the second edge computing entity prior to expiration of the second time window.

9. The edge computing entity of claim 8 further comprises:
the set of data streams of the second plurality of data streams and the first set of data streams of the first plurality of data streams are from same IoT device.

10. The edge computing entity of claim 7, wherein the processing module further functions to:
determine whether a second set of data streams of the first plurality of data streams has been requested by the second edge computing entity of the secure data communication system; and
when the second set of data streams of the first plurality of data streams is requested and the request for the second set of data streams of the first plurality of data streams is valid, send, via the interface, the second set of data streams of the first plurality of data streams to the second edge computing entity prior to expiration of the first time window.

11. The edge computing entity of claim 7, wherein the processing module further functions to:
determine whether a second set of data streams of the first plurality of data streams has been requested by a third edge computing entity of the secure data communication system; and
when the second set of data streams of the first plurality of data streams is requested and the request for the second set of data streams of the first plurality of data streams is valid, send, via the interface, the second set of data streams of the first plurality of data streams to the third edge computing entity prior to expiration of the first time window.

12. The edge computing entity of claim 7, wherein the processing module functions to determine whether the first set of data streams of the first plurality of data streams has been requested by the second edge computing entity by one or more of:
indicating that at least one data stream of the first set of data streams has been requested by the second edge computing entity when a subscription request generated by the second edge computing entity associates the at least one data stream of the first set of data streams to the second edge computing entity;
indicating that the at least one data stream of the first set of data streams has been requested by the second edge computing entity when a subscription mapping associates the at least one data stream of the first set of data streams to the second edge computing entity;

indicating that the at least one data stream of the first set of data streams has been requested by the second edge computing entity when a data pattern of the at least one data stream matches a reference data pattern of a desired data stream for the second edge computing entity; and indicating that the at least one data stream of the first set of data streams has been requested by the second edge computing entity when a data type of the at least one data stream matches a desired data type for the second edge computing entity.

13. A computer readable memory comprises:

a first memory element that stores operational instructions that, when executed by a processing module of an edge computing entity of a secure data communication system, causes the processing module to:

receive, during a first time window, a first plurality of data streams from a plurality of Internet of Things (IoT) sensors; and temporarily store, during the first time window, the first plurality of data streams;

a second memory element that stores operational instructions that, when executed by the processing module, causes the processing module to:

determine whether a first set of data streams of the first plurality of data streams has been requested by a second edge computing entity of the secure data communication system; and when the first set of data streams is requested and the request is valid, send the first set of data streams to the second edge computing entity prior to expiration of the first time window; and a third memory element that stores operational instructions that, when executed by the processing module, causes the processing module to:

receive, during a second time window, a second plurality of data streams from the plurality of IoT sensors, wherein the second time window is subsequent in time to the first time window; and overwriting the temporary storage of the first plurality of data streams with the second plurality of data streams during the second time window.

14. The computer readable memory of claim 13 further comprises:

a fourth memory element that stores operational instructions that, when executed by the processing module, causes the processing module to:

determine whether a set of data streams of the second plurality of data streams has been requested by the second edge computing entity of the secure data communication system; and when the set of data streams of the second plurality of data streams is requested and the request for the set of data streams of the second plurality of data streams is valid, send the set of data streams of the second plurality of data streams to the second edge computing entity prior to expiration of the second time window.

15. The computer readable memory of claim 14 further comprises:

the set of data streams of the second plurality of data streams and the first set of data streams of the first plurality of data streams are from same IoT device.

16. The computer readable memory of claim 13 further comprises:

the second memory element further stores operational instructions that, when executed by the processing module, causes the processing module to:

determine whether a second set of data streams of the first plurality of data streams has been requested by the second edge computing entity of the secure data communication system; and when the second set of data streams of the first plurality of data streams is requested and the request for the second set of data streams of the first plurality of data streams is valid, send the second set of data streams of the first plurality of data streams to the second edge computing entity prior to expiration of the first time window.

17. The computer readable memory of claim 13 further comprises:

the second memory element further stores operational instructions that, when executed by the processing module, causes the processing module to:

determine whether a second set of data streams of the first plurality of data streams has been requested by a third edge computing entity of the secure data communication system; and when the second set of data streams of the first plurality of data streams is requested and the request for the second set of data streams of the first plurality of data streams is valid, send the second set of data streams of the first plurality of data streams to the third edge computing entity prior to expiration of the first time window.

18. The computer readable memory of claim 13, wherein the processing module functions to execute the operational instructions stored by the second memory element to cause the processing module to determine whether the first set of data streams of the first plurality of data streams has been requested by the second edge computing entity by one or more of:

indicating that at least one data stream of the first set of data streams has been requested by the second edge computing entity when a subscription request generated by the second edge computing entity associates the at least one data stream of the first set of data streams to the second edge computing entity;

indicating that the at least one data stream of the first set of data streams has been requested by the second edge computing entity when a subscription mapping associates the at least one data stream of the first set of data streams to the second edge computing entity;

indicating that the at least one data stream of the first set of data streams has been requested by the second edge computing entity when a data pattern of the at least one data stream matches a reference data pattern of a desired data stream for the second edge computing entity; and indicating that the at least one data stream of the first set of data streams has been requested by the second edge computing entity when a data type of the at least one data stream matches a desired data type for the second edge computing entity.

* * * * *